(12) United States Patent
Hayashi

(10) Patent No.: US 8,416,544 B2
(45) Date of Patent: Apr. 9, 2013

(54) SEMICONDUCTOR INTEGRATED CIRCUIT INCLUDING INTERNAL CIRCUITS AND ELECTROSTATIC DISCHARGE PROTECTION CIRCUITS

(75) Inventor: Hirofumi Hayashi, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 118 days.

(21) Appl. No.: 13/162,373

(22) Filed: Jun. 16, 2011

(65) Prior Publication Data

US 2011/0310515 A1    Dec. 22, 2011

(30) Foreign Application Priority Data

Jun. 16, 2010 (JP) ................................. 2010-137346

(51) Int. Cl.
*H02H 3/22* (2006.01)
(52) U.S. Cl.
USPC .......................................... 361/56; 361/111
(58) Field of Classification Search ................... 361/56, 361/111
See application file for complete search history.

(56) References Cited

U.S. PATENT DOCUMENTS 5,991,135 A  * 11/1999 Saleh ............................... 361/56
2006/0077601 A1* 4/2006 Ikeda et al. ...................... 361/56

OTHER PUBLICATIONS

Ming-Dou Ker et al., "Whole-Chip ESD Protection Strategy for CMOS IC's with Multiple Mixed-Voltage Power Pins", 1999, International Symposium on VLSI Technology, Systems, and Applications, pp. 298-301.
Ming-Dou Ker et al., "ESD Buses for Whole-Chip ESD Protection", Proceedings of the 1999 IEEE International Symposium on Circuits and Systems, vol. 1, pp. 545-548.

* cited by examiner

*Primary Examiner* — Danny Nguyen
(74) *Attorney, Agent, or Firm* — Miles & Stockbridge P.C.

(57) ABSTRACT

The disclosed invention reduces an increase in the number of electrostatic discharge protection circuits or the number of electrostatic discharge protection elements due to increases in the number of separations of power voltages and the number of separations of ground voltages. A semiconductor integrated circuit includes first, second, and third operation voltage supply terminals; first, second, and third internal circuits; first, second, and third electrostatic discharge protection circuits; and a coupling midpoint. The first, second, and third internal circuits operate at first, second, and third operation voltages supplied to the first, second, and third operation voltage supply terminals, respectively. The first, second, and third electrostatic discharge protection circuits are coupled between the first, second, and third operation voltage supply terminals and the coupling midpoint, respectively. That is, instead of the past Δ (delta) coupling, the first, second, and third electrostatic discharge protection circuits are Y (star)-coupled with respect to the coupling midpoint.

20 Claims, 10 Drawing Sheets

SEMICONDUCTOR INTEGRATED CIRCUIT INCLUDING INTERNAL CIRCUITS AND ELECTROSTATIC DISCHARGE PROTECTION CIRCUITS

CROSS-REFERENCE TO RELATED APPLICATIONS

The disclosure of Japanese Patent Application No. 2010-137346 filed on Jun. 16, 2010 including the specification, drawings and abstract is incorporated herein by reference in its entirety.

BACKGROUND

The present invention relates to a semiconductor integrated circuit including internal circuits and electrostatic discharge protection circuits, and in particular, relates to a technique effective at reducing an increase in the number of electrostatic discharge protection circuits or the number of electrostatic discharge protection elements due to increases in the number of separations of power voltages and the number of separations of ground voltages.

Heretofore, semiconductor integrated circuits have included ESD protection circuits to protect the semiconductor integrated circuits from damage caused by electrostatic discharge (ESD).

In such a semiconductor integrated circuit, a power voltage supplied to an internal circuit is lowered by transistor miniaturization for higher speed, whereas a relatively high power voltage is supplied to an input/output circuit (I/O circuit) for inputting and outputting input/output signals of a relatively high voltage level with the outside of the semiconductor integrated circuit. Further, a relatively low power voltage is supplied to an internal circuit such as a digital logic circuit configured with miniaturized transistors, whereas a relatively high power voltage is supplied to an analog circuit such as an analog/digital converter and a digital/analog converter.

Thus, in the semiconductor integrated circuit, a plurality of internal circuits that have not only different power voltages but also different circuit operations are integrated. Further, in large-scale semiconductor integrated circuits, power terminals and ground terminals are separated to prevent noise coupling, power fluctuation, and ground fluctuation.

The following non-patent documents 1 and 2 describe a whole-chip ESD protection scheme for preventing ESD damage to internal circuits in a CMOS-IC having three kinds of power voltages of 2.5, 3, and 5 V. In this scheme, a 2.5-V internal circuit, a 3-V internal circuit, and a 5-V internal circuit are coupled through bi-directional ESD coupling cells to a second ESD bus to which a ground voltage is supplied, the 2.5-V internal circuit is coupled through a bi-directional ESD coupling cell to a first ESD bus to which a power voltage of 2.5 V is supplied, the 3-V internal circuit is coupled through a bi-directional ESD coupling cell to a fourth ESD bus to which a power voltage of 3 V is supplied, and the 5-V internal circuit is coupled through a bi-directional ESD coupling cell to a third ESD bus to which a power voltage of 5 V is supplied. Further, an ESD clamp cell is coupled between the first ESD bus to which the power voltage of 2.5 V is supplied and the second ESD bus to which the ground voltage is supplied, an ESD clamp cell is coupled between the first ESD bus to which the power voltage of 2.5 V is supplied and the fourth ESD bus to which the power voltage of 3 V is supplied, an ESD clamp cell is coupled between the fourth ESD bus to which the power voltage of 3 V is supplied and the second ESD bus to which the ground voltage is supplied, an ESD clamp cell is coupled between the fourth ESD bus to which the power voltage of 3 V is supplied and the third ESD bus to which the power voltage of 5 V is supplied, and an ESD clamp cell is coupled between the third ESD bus to which the power voltage of 5 V is supplied and the second ESD bus to which the ground voltage is supplied.

[Non-Patent Document 1]
Ming-Dou Ker et al, "Whole-Chip ESD Protection Strategy for CMOS IC's with Multiple Mixed-Voltage Power Pins", 1999 International Symposium on VLSI Technology, Systems, and Applications, PP. 298-301.

[Non-Patent Document 2]
Ming-Dou Ker et al, "ESD BUSES FOR WHOLE-CHIP ESD PROTECTION", Proceedings of the 1999 IEEE International Symposium on Circuits and Systems, Volume 1, PP. 545-548.

SUMMARY

Prior to the present invention, the present inventors et al. have been involved in the development of a semiconductor integrated circuit which incorporates multifunctional and various kinds of internal circuits and to which various kinds of power voltages are supplied from outside. Particularly, in the development of this semiconductor integrated circuit, the development of ESD protection circuits for protecting various kinds of internal circuits to which various kinds of internal circuits are supplied was necessary.

Further, an integrated circuit for an automotive power train incorporates multi-train driver circuits which require different power voltage levels to be applied.

FIG. 1 is a diagram showing the configuration of a semiconductor integrated circuit having three kinds of power voltages and three kinds of ground voltages which has been examined by the present inventors et al. prior to the invention.

The semiconductor integrated circuit 1 shown in FIG. 1 includes a first internal circuit 11, a second internal circuit 12, and a third internal circuit 13. Further, the semiconductor integrated circuit 1 shown in FIG. 1 includes a first power voltage supply terminal 21, a second power voltage supply terminal 22, a third power voltage supply terminal 23, a first ground voltage supply terminal 31, a second ground voltage supply terminal 32, and a third ground voltage supply terminal 33.

A first power voltage Vdd1 from outside the semiconductor integrated circuit 1 can be supplied to the first power voltage supply terminal 21. A first ground voltage Vss1 from outside the semiconductor integrated circuit 1 can be supplied to the first ground voltage supply terminal 31. The first internal circuit 11 can operate at the potential difference between the first power voltage Vdd1 and the first ground voltage Vss1.

A second power voltage Vdd2 from outside the semiconductor integrated circuit 1 can be supplied to the second power voltage supply terminal 22. A second ground voltage Vss2 from outside the semiconductor integrated circuit 1 can be supplied to the second ground voltage supply terminal 32. The second internal circuit 12 can operate at the potential difference between the second power voltage Vdd2 and the second ground voltage Vss2.

A third power voltage Vdd3 from outside the semiconductor integrated circuit 1 can be supplied to the third power voltage supply terminal 23. A third ground voltage Vss3 from outside the semiconductor integrated circuit 1 can be supplied to the third ground voltage supply terminal 33. The third internal circuit 13 can operate at the potential difference between the third power voltage Vdd3 and the third ground voltage Vss3.

A first power side electrostatic discharge protection circuit 41 is coupled between the first power voltage supply terminal 21 and the second power voltage supply terminal 22. The first power side electrostatic discharge protection circuit 41 prevents an excessive external surge voltage from being applied to either of the first internal circuit 11 and the second internal circuit 12 by clamping an increased potential difference between the first power voltage supply terminal 21 and the second power voltage supply terminal 22 to a first predetermined power side potential difference.

A second power side electrostatic discharge protection circuit 42 is coupled between the second power voltage supply terminal 22 and the third power voltage supply terminal 23. The second power side electrostatic discharge protection circuit 42 prevents an excessive external surge voltage from being applied to either of the second internal circuit 12 and the third internal circuit 13 by clamping an increased potential difference between the second power voltage supply terminal 22 and the third power voltage supply terminal 23 to a second predetermined power side potential difference.

A third power side electrostatic discharge protection circuit 43 is coupled between the third power voltage supply terminal 23 and the first power voltage supply terminal 21. The third power side electrostatic discharge protection circuit 43 prevents an excessive external surge voltage from being applied to either of the third internal circuit 13 and the first internal circuit 11 by clamping an increased potential difference between the third power voltage supply terminal 23 and the first power voltage supply terminal 21 to a third predetermined power side potential difference.

A first ground side electrostatic discharge protection circuit 51 is coupled between the first ground voltage supply terminal 31 and the second ground voltage supply terminal 32. The first ground side electrostatic discharge protection circuit 51 prevents an excessive external surge voltage from being applied to either of the first internal circuit 11 and the second internal circuit 12 by clamping an increased potential difference between the first ground voltage supply terminal 31 and the second ground voltage supply terminal 32 to a first predetermined ground side potential difference.

A second ground side electrostatic discharge protection circuit 52 is coupled between the second ground voltage supply terminal 32 and the third ground voltage supply terminal 33. The second ground side electrostatic discharge protection circuit 52 prevents an excessive external surge voltage from being applied to either of the second internal circuit 12 and the third internal circuit 13 by clamping an increased potential difference between the second ground voltage supply terminal 32 and the third ground voltage supply terminal 33 to a second predetermined ground side potential difference.

A third ground side electrostatic discharge protection circuit 53 is coupled between the third ground voltage supply terminal 33 and the first ground voltage supply terminal 31. The third ground side electrostatic discharge protection circuit 53 prevents an excessive external surge voltage from being applied to either of the third internal circuit 13 and the first internal circuit 11 by clamping an increased potential difference between the third ground voltage supply terminal 33 and the first ground voltage supply terminal 31 to a third predetermined ground side potential difference.

FIG. 2 is a diagram showing the configuration of a semiconductor integrated circuit having four kinds of power voltages and four kinds of ground voltages which has been examined by the present inventors et al. prior to the invention.

The semiconductor integrated circuit 1 shown in FIG. 2 includes a first internal circuit 11, a second internal circuit 12, a third internal circuit 13, and a fourth internal circuit 14. Further, the semiconductor integrated circuit 1 shown in FIG. 2 includes a first power voltage supply terminal 21, a second power voltage supply terminal 22, a third power voltage supply terminal 23, a fourth power voltage supply terminal 24, a first ground voltage supply terminal 31, a second ground voltage supply terminal 32, a third ground voltage supply terminal 33, and a fourth ground voltage supply terminal 34.

A first power voltage Vdd1 from outside the semiconductor integrated circuit 1 can be supplied to the first power voltage supply terminal 21. A first ground voltage Vss1 from outside the semiconductor integrated circuit 1 can be supplied to the first ground voltage supply terminal 31. The first internal circuit 11 can operate at the potential difference between the first power voltage Vdd1 and the first ground voltage Vss1.

A second power voltage Vdd2 from outside the semiconductor integrated circuit 1 can be supplied to the second power voltage supply terminal 22. A second ground voltage Vss2 from outside the semiconductor integrated circuit 1 can be supplied to the second ground voltage supply terminal 32. The second internal circuit 12 can operate at the potential difference between the second power voltage Vdd2 and the second ground voltage Vss2.

A third power voltage Vdd3 from outside the semiconductor integrated circuit 1 can be supplied to the third power voltage supply terminal 23. A third ground voltage Vss3 from outside the semiconductor integrated circuit 1 can be supplied to the third ground voltage supply terminal 33. The third internal circuit 13 can operate at the potential difference between the third power voltage Vdd3 and the third ground voltage Vss3.

A fourth power voltage Vdd4 from outside the semiconductor integrated circuit 1 can be supplied to the fourth power voltage supply terminal 24. A fourth ground voltage Vss4 from outside the semiconductor integrated circuit 1 can be supplied to the fourth ground voltage supply terminal 34. The fourth internal circuit 14 can operate at the potential difference between the fourth power voltage Vdd4 and the fourth ground voltage Vss4.

A first power side electrostatic discharge protection circuit 41 is coupled between the first power voltage supply terminal 21 and the second power voltage supply terminal 22. The first power side electrostatic discharge protection circuit 41 prevents an excessive external surge voltage from being applied to either of the first internal circuit 11 and the second internal circuit 12 by clamping an increased potential difference between the first power voltage supply terminal 21 and the second power voltage supply terminal 22 to a first predetermined power side potential difference.

A second power side electrostatic discharge protection circuit 42 is coupled between the second power voltage supply terminal 22 and the third power voltage supply terminal 23. The second power side electrostatic discharge protection circuit 42 prevents an excessive external surge voltage from being applied to either of the second internal circuit 12 and the third internal circuit 13 by clamping an increased potential difference between the second power voltage supply terminal 22 and the third power voltage supply terminal 23 to a second predetermined power side potential difference.

A third power side electrostatic discharge protection circuit 43 is coupled between the third power voltage supply terminal 23 and the fourth power voltage supply terminal 24. The third power side electrostatic discharge protection circuit 43 prevents an excessive external surge voltage from being applied to either of the third internal circuit 13 and the fourth internal circuit 14 by clamping an increased potential difference between the third power voltage supply terminal 23 and the fourth power voltage supply terminal 24 to a third predetermined power side potential difference.

A fourth power side electrostatic discharge protection circuit 44 is coupled between the fourth power voltage supply terminal 24 and the first power voltage supply terminal 21. The fourth power side electrostatic discharge protection circuit 44 prevents an excessive external surge voltage from being applied to either of the fourth internal circuit 14 and the first internal circuit 11 by clamping an increased potential difference between the fourth power voltage supply terminal 24 and the first power voltage supply terminal 21 to a fourth predetermined power side potential difference.

A fifth power side electrostatic discharge protection circuit 45 is coupled between the first power voltage supply terminal 21 and the third power voltage supply terminal 23. The fifth power side electrostatic discharge protection circuit 45 prevents an excessive external surge voltage from being applied to either of the first internal circuit 11 and the third internal circuit 13 by clamping an increased potential difference between the first power voltage supply terminal 21 and the third power voltage supply terminal 23 to a fifth predetermined power side potential difference.

A sixth power side electrostatic discharge protection circuit 46 is coupled between the second power voltage supply terminal 22 and the fourth power voltage supply terminal 24. The sixth power side electrostatic discharge protection circuit 46 prevents an excessive external surge voltage from being applied to either of the second internal circuit 12 and the fourth internal circuit 14 by clamping an increased potential difference between the second power voltage supply terminal 22 and the fourth power voltage supply terminal 24 to a sixth predetermined power side potential difference.

A first ground side electrostatic discharge protection circuit 51 is coupled between the first ground voltage supply terminal 31 and the second ground voltage supply terminal 32. The first ground side electrostatic discharge protection circuit 51 prevents an excessive external surge voltage from being applied to either of the first internal circuit 11 and the second internal circuit 12 by clamping an increased potential difference between the first ground voltage supply terminal 31 and the second ground voltage supply terminal 32 to a first predetermined ground side potential difference.

A second ground side electrostatic discharge protection circuit 52 is coupled between the second ground voltage supply terminal 32 and the third ground voltage supply terminal 33. The second ground side electrostatic discharge protection circuit 52 prevents an excessive external surge voltage from being applied to either of the second internal circuit 12 and the third internal circuit 13 by clamping an increased potential difference between the second ground voltage supply terminal 32 and the third ground voltage supply terminal 33 to a second predetermined ground side potential difference.

A third ground side electrostatic discharge protection circuit 53 is coupled between the third ground voltage supply terminal 33 and the fourth ground voltage supply terminal 34. The third ground side electrostatic discharge protection circuit 53 prevents an excessive external surge voltage from being applied to either of the third internal circuit 13 and the fourth internal circuit 14 by clamping an increased potential difference between the third ground voltage supply terminal 33 and the fourth ground voltage supply terminal 34 to a third predetermined ground side potential difference.

A fourth ground side electrostatic discharge protection circuit 54 is coupled between the fourth ground voltage supply terminal 34 and the first ground voltage supply terminal 31. The fourth ground side electrostatic discharge protection circuit 54 prevents an excessive external surge voltage from being applied to either of the fourth internal circuit 14 and the first internal circuit 11 by clamping an increased potential difference between the fourth ground voltage supply terminal 34 and the first ground voltage supply terminal 31 to a fourth predetermined ground side potential difference.

A fifth ground side electrostatic discharge protection circuit 55 is coupled between the first ground voltage supply terminal 31 and the third ground voltage supply terminal 33. The fifth ground side electrostatic discharge protection circuit 55 prevents an excessive external surge voltage from being applied to either of the first internal circuit 11 and the third internal circuit 13 by clamping an increased potential difference between the first ground voltage supply terminal 31 and the third ground voltage supply terminal 33 to a fifth predetermined ground side potential difference.

A sixth ground side electrostatic discharge protection circuit 56 is coupled between the second ground voltage supply terminal 32 and the fourth ground voltage supply terminal 34. The sixth ground side electrostatic discharge protection circuit 56 prevents an excessive external surge voltage from being applied to either of the second internal circuit 12 and the fourth internal circuit 14 by clamping an increased potential difference between the second ground voltage supply terminal 32 and the fourth ground voltage supply terminal 34 to a sixth predetermined ground side potential difference.

FIG. 3 is a diagram showing the configurations of the first power side electrostatic discharge protection circuit 41, the second power side electrostatic discharge protection circuit 42, the third power side electrostatic discharge protection circuit 43, the first ground side electrostatic discharge protection circuit 51, the second ground side electrostatic discharge protection circuit 52, and the third ground side electrostatic discharge protection circuit 53 included in the semiconductor integrated circuit 1 having three kinds of power voltages and three kinds of ground voltages, shown in FIG. 1, which has been examined by the present inventors et al. prior to the invention.

As shown in FIG. 3, each of the first power side electrostatic discharge protection circuit 41, the second power side electrostatic discharge protection circuit 42, and the third power side electrostatic discharge protection circuit 43 is configured with two PN junction diodes coupled back to back. Therefore, the first, second, and third predetermined power side clamp potential difference is a voltage Vf+BV obtained by adding the forward voltage Vf of a first PN junction diode to the reverse breakdown voltage BV of a second PN junction diode.

As shown in FIG. 3, each of the first ground side electrostatic discharge protection circuit 51, the second ground side electrostatic discharge protection circuit 52, and the third ground side electrostatic discharge protection circuit 53 is configured with two PN junction diodes parallel-coupled in a mutually opposite direction. Therefore, the first, second, and third predetermined ground side clamp potential difference is the forward voltage Vf of a PN junction diode.

As can be seen in FIG. 3, the total number of PN junction diodes in all the electrostatic discharge protection circuits included in the semiconductor integrated circuit 1 having three kinds of power voltages and three kinds of ground voltages is 12.

FIG. 4 is a diagram showing the configurations of the first power side electrostatic discharge protection circuit 41, the second power side electrostatic discharge protection circuit 42, the third power side electrostatic discharge protection circuit 43, the fourth power side electrostatic discharge protection circuit 44, the fifth power side electrostatic discharge protection circuit 45, the sixth power side electrostatic discharge protection circuit 46, the first ground side electrostatic discharge protection circuit 51, the second ground side electrostatic discharge protection circuit 52, the third ground side electrostatic discharge protection circuit 53, the fourth ground side electrostatic discharge protection circuit 54, the fifth ground side electrostatic discharge protection circuit 55, and the sixth ground side electrostatic discharge protection circuit 56 included in the semiconductor integrated circuit 1 having four kinds of power voltages and four kinds of ground voltages, shown in FIG. 2, which has been examined by the present inventors et al. prior to the invention.

As shown in FIG. 4, each of the first power side electrostatic discharge protection circuit 41, the second power side electrostatic discharge protection circuit 42, the third power side electrostatic discharge protection circuit 43, the fourth power side electrostatic discharge protection circuit 44, the fifth power side electrostatic discharge protection circuit 45, and the sixth power side electrostatic discharge protection circuit 46 is configured with two PN junction diodes coupled back to back. Therefore, the first, second, third, fourth, fifth, and sixth predetermined power side clamp potential difference is a voltage Vf+BV obtained by adding the forward voltage Vf of a first PN junction diode to the reverse breakdown voltage BV of a second PN junction diode.

As shown in FIG. 4, each of the first ground side electrostatic discharge protection circuit 51, the second ground side electrostatic discharge protection circuit 52, the third ground side electrostatic discharge protection circuit 53, the fourth ground side electrostatic discharge protection circuit 54, the fifth ground side electrostatic discharge protection circuit 55, and the sixth ground side electrostatic discharge protection circuit 56 is configured with two PN junction diodes parallel-coupled in a mutually opposite direction. Therefore, the first, second, third, fourth, fifth, and sixth predetermined ground side clamp potential difference is the forward voltage Vf of a PN junction diode.

As can be seen in FIG. 4, the total number of PN junction diodes in all the electrostatic discharge protection circuits included in the semiconductor integrated circuit 1 having four kinds of power voltages and four kinds of ground voltages is 24.

As can be seen, the total number of PN junction diodes in all the electrostatic discharge protection circuits included in the semiconductor integrated circuit 1 having three kinds of power voltages and three kinds of ground voltages shown in FIG. 3 is 12, whereas the total number of PN junction diodes in all the electrostatic discharge protection circuits included in the semiconductor integrated circuit 1 having four kinds of power voltages and four kinds of ground voltages shown in FIG. 4 is greatly increased to 24.

Further, examination by the present inventors et al. revealed that the total number of PN junction diodes in all the electrostatic discharge protection circuits included in the semiconductor integrated circuit 1 having five kinds of power voltages and five kinds of ground voltages is 40, and the total number of PN junction diodes in all the electrostatic discharge protection circuits included in the semiconductor integrated circuit 1 having six kinds of power voltages and six kinds of ground voltages is 60.

On the other hand, recent large-scale semiconductor integrated circuits are required to integrate a great number of operation functions. As a result, various kinds of power voltages and various kinds of ground voltages are required, and the separations of various kinds of power voltages and the separations of various kinds of ground voltages are needed. With this trend, due to increases in the number of separations of power voltages and the number of separations of ground voltages, the number of electrostatic discharge protection elements required for the past electrostatic discharge protection circuit drastically increases. In a large-scale semiconductor integrated circuit that has recently been developed, in the case where the number of separations of battery voltages is five, the number of separations of power voltages is seven, and the number of separations of ground voltages is nine, the space of all the electrostatic discharge protection circuits occupies approximately 20% of the semiconductor chip, which is not negligible.

The invention has been made as a result of the examination by the present inventors et al. prior to the invention.

Accordingly, it is an object of the invention to reduce an increase in the number of electrostatic discharge protection circuits or the number of electrostatic discharge protection elements due to increases in the number of separations of power voltages and the number of separations of ground voltages.

The above and other objects and novel features of the present invention will become apparent from the description of this specification and the accompanying drawings.

A typical aspect of the invention disclosed in the present application will be briefly described as follows.

A semiconductor integrated circuit (1) according to a typical embodiment of the invention includes first, second, and third operation voltage supply terminals (21, 22, 23) to which operation voltages of mutually different voltage levels can be supplied from outside; first, second, and third internal circuits (11, 12, 13); first, second, and third electrostatic discharge protection circuits (41, 42, 43); and a coupling midpoint (Cd).

The first, second, and third internal circuits (11, 12, 13) operate at first, second, and third operation voltages (Vdd1, Vdd2, Vdd3) supplied to the first, second, and third operation voltage supply terminals (21, 22, 23), respectively.

The first electrostatic discharge protection circuit (41) is coupled between the first operation voltage supply terminal (21) and the coupling midpoint (Cd), the second electrostatic discharge protection circuit (42) is coupled between the second operation voltage supply terminal (22) and the coupling midpoint (Cd), and the third electrostatic discharge protection circuit (43) is coupled between the third operation voltage supply terminal (23) and the coupling midpoint (Cd).

Accordingly, instead of the past Δ (delta) coupling, the first, second, and third electrostatic discharge protection circuits (41, 42, 43) are Y (star)-coupled with respect to the coupling midpoint (Cd) (see FIG. 5).

A typical effect of the invention disclosed in the present application will be briefly described as follows.

According to the invention, it is possible to reduce an increase in the number of electrostatic discharge protection circuits or the number of electrostatic discharge protection elements due to increases in the number of separations of power voltages and the number of separations of ground voltages.

DETAILED DESCRIPTION

1. Outline of Embodiments

Figure 1:
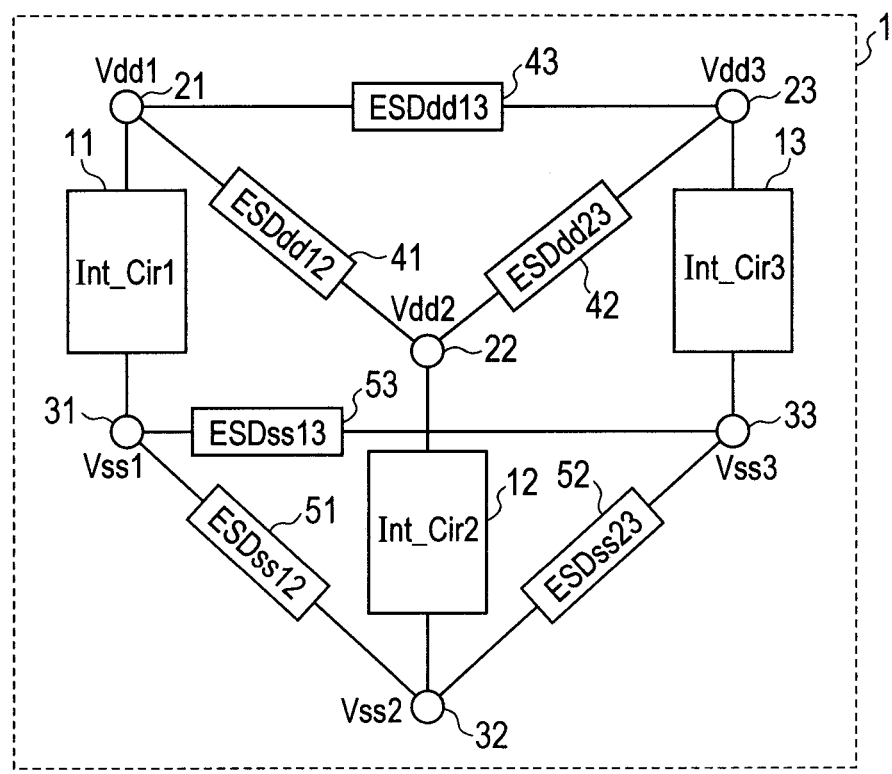
FIG. 1 is a diagram showing the configuration of a semiconductor integrated circuit having three kinds of power voltages and three kinds of ground voltages which has been examined by the present inventors et al. prior to the invention.
Figure 2:
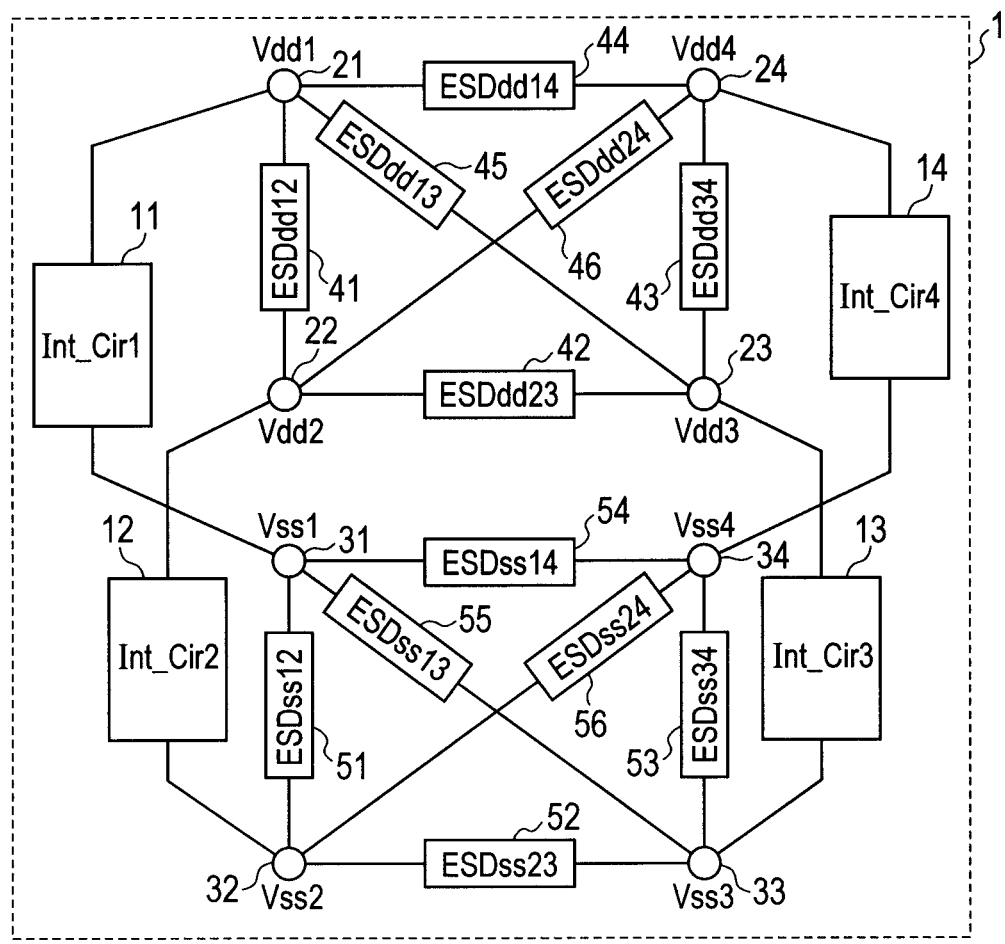
FIG. 2 is a diagram showing the configuration of a semiconductor integrated circuit having four kinds of power voltages and four kinds of ground voltages which has been examined by the present inventors et al. prior to the invention.
Figure 3:
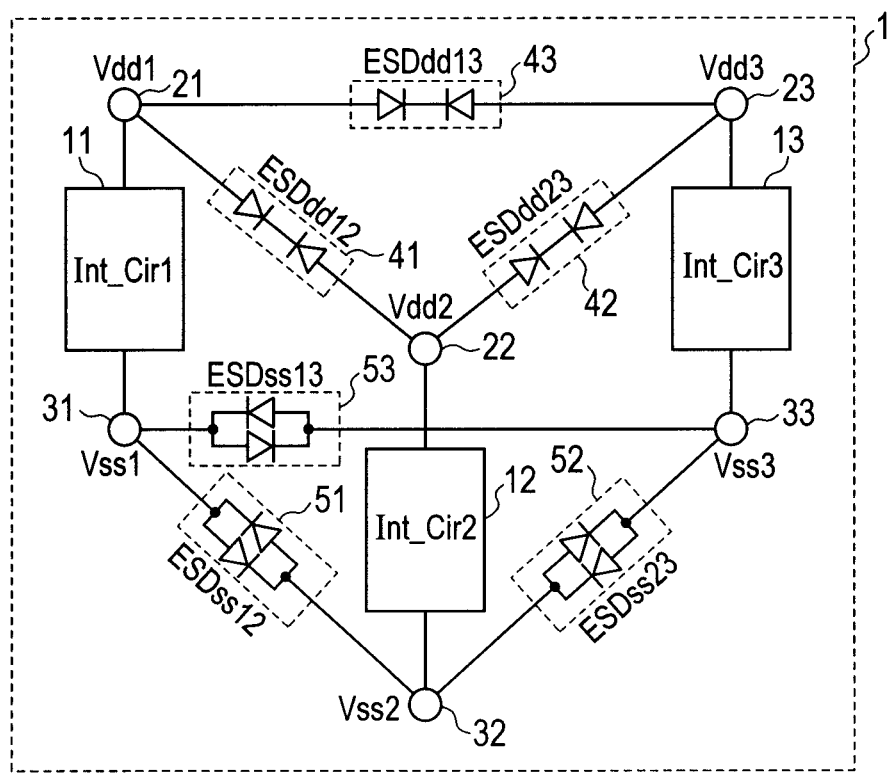
FIG. 3 is a diagram showing the configurations of a first power side electrostatic discharge protection circuit 41, a second power side electrostatic discharge protection circuit 42, a third power side electrostatic discharge protection circuit 43, a first ground side electrostatic discharge protection circuit 51, a second ground side electrostatic discharge protection circuit 52, and a third ground side electrostatic discharge protection circuit 53 included in the semiconductor integrated circuit 1 having three kinds of power voltages and three kinds of ground voltages, shown in FIG. 1, which has been examined by the present inventors et al. prior to the invention.
Figure 4:
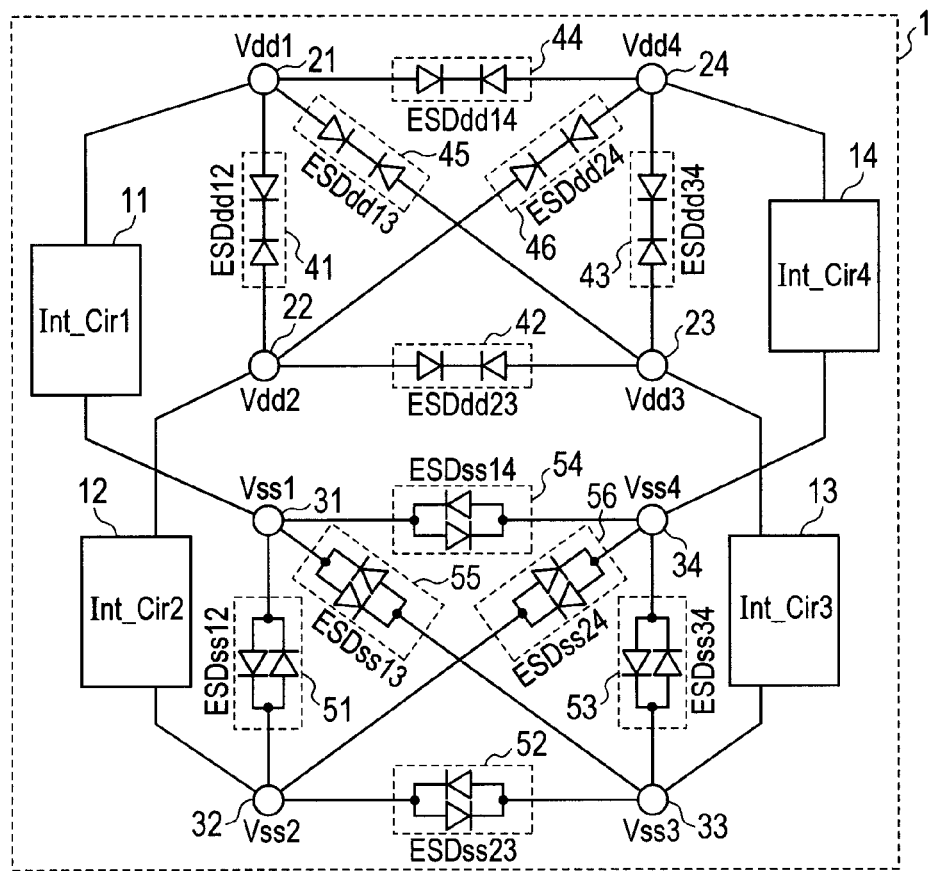
FIG. 4 is a diagram showing the configurations of a first power side electrostatic discharge protection circuit 41, a second power side electrostatic discharge protection circuit 42, a third power side electrostatic discharge protection circuit 43, a fourth power side electrostatic discharge protection circuit 44, a fifth power side electrostatic discharge protection circuit 45, a sixth power side electrostatic discharge protection circuit 46, a first ground side electrostatic discharge protection circuit 51, a second ground side electrostatic discharge protection circuit 52, a third ground side electrostatic discharge protection circuit 53, a fourth ground side electrostatic discharge protection circuit 54, a fifth ground side electrostatic discharge protection circuit 55, and a sixth ground side electrostatic discharge protection circuit 56 included in the semiconductor integrated circuit 1 having four kinds of power voltages and four kinds of ground voltages, shown in FIG. 2, which has been examined by the present inventors et al. prior to the invention.

First, the outline of typical embodiments of the invention disclosed in the present application will be described. Reference numerals in the drawings that refer to with parentheses applied thereto in the outline description of the typical embodiments are merely illustration of ones contained in the concepts of components marked with the reference numerals.

[1] A semiconductor integrated circuit (1) according to a typical embodiment of the invention includes a first operation voltage supply terminal (21), a second operation voltage supply terminal (22), and a third operation voltage supply terminal (23) to which operation voltages of mutually different voltage levels can be supplied from outside the semiconductor integrated circuit, and includes a first internal circuit (11), a second internal circuit (12), a third internal circuit (13), a first electrostatic discharge protection circuit (41), a second electrostatic discharge protection circuit (42), a third electrostatic discharge protection circuit (43), and a coupling midpoint (Cd).

The first internal circuit (11) can operate at a first operation voltage (Vdd1) supplied through the first operation voltage supply terminal (21), the second internal circuit (12) can operate at a second operation voltage (Vdd2) supplied through the second operation voltage supply terminal (22), and the third internal circuit (13) can operate at a third operation voltage (Vdd3) supplied through the third operation voltage supply terminal (23).

Figure 5:
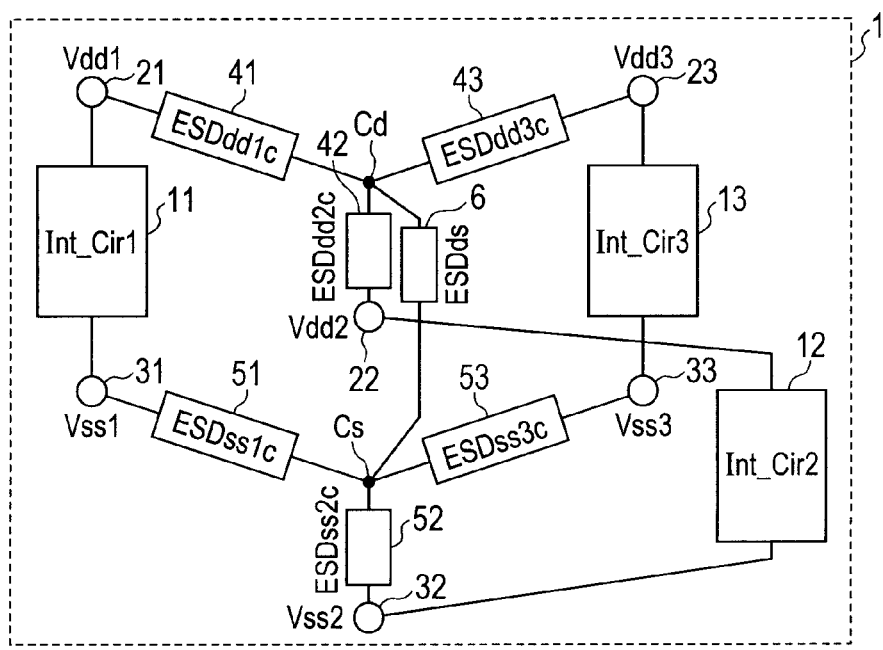
FIG. 5 is a diagram showing the configuration of a semiconductor integrated circuit 1 having three kinds of power voltages and three kinds of ground voltages, according to a first embodiment of the invention.

The first electrostatic discharge protection circuit (41) is coupled between the first operation voltage supply terminal (21) and the coupling midpoint (Cd), the second electrostatic discharge protection circuit (42) is coupled between the second operation voltage supply terminal (22) and the coupling midpoint (Cd), and the third electrostatic discharge protection circuit (43) is coupled between the third operation voltage supply terminal (23) and the coupling midpoint (Cd) (see FIG. 5).

According to this embodiment, it is possible to reduce an increase in the number of electrostatic discharge protection circuits or the number of electrostatic discharge protection elements due to increases in the number of separations of power voltages and the number of separations of ground voltages.

Figure 7:
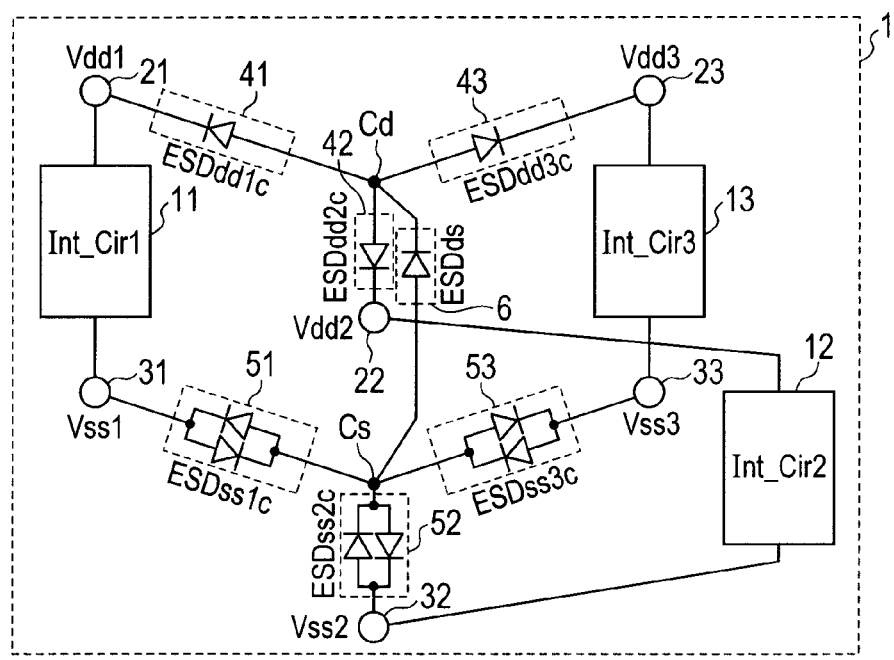
FIG. 7 is a diagram showing the configurations of a first power side electrostatic discharge protection circuit 41, a second power side electrostatic discharge protection circuit 42, a third power side electrostatic discharge protection circuit 43, a first ground side electrostatic discharge protection circuit 51, a second ground side electrostatic discharge protection circuit 52, and a third ground side electrostatic discharge protection circuit 53 included in the semiconductor integrated circuit 1 having three kinds of power voltages and three kinds of ground voltages according to the first embodiment of the invention, shown in FIG. 5.

In a preferred embodiment, the first electrostatic discharge protection circuit (41) includes a first voltage clamp element for clamping an increased potential difference between the first operation voltage supply terminal (21) and the coupling midpoint (Cd) to a first operation potential difference, the second electrostatic discharge protection circuit (42) includes a second voltage clamp element for clamping an increased potential difference between the second operation voltage supply terminal (22) and the coupling midpoint (Cd) to a second operation potential difference, and the third electrostatic discharge protection circuit (43) includes a third voltage clamp element for clamping an increased potential difference between the third operation voltage supply terminal (23) and the coupling midpoint (Cd) to a third operation potential difference (see FIG. 7).

In another preferred embodiment, the coupling midpoint (Cd) is electrically coupled to a ground potential point (Cs) through a current path (see FIG. 5).

In yet another preferred embodiment, the first internal circuit (11) includes the most miniaturized transistor in the semiconductor integrated circuit (1), the second internal circuit (12) includes the second most miniaturized transistor in the semiconductor integrated circuit (1), and the third internal circuit (13) includes the third most miniaturized transistor in the semiconductor integrated circuit (1).

A voltage level of the second operation voltage (Vdd2) supplied to the second operation voltage supply terminal (22) is set to a higher level than a voltage level of the first operation voltage (Vdd1) supplied to the first operation voltage supply terminal (21), and a voltage level of the third operation voltage (Vdd3) supplied to the third operation voltage supply terminal (23) is set to a higher level than the voltage level of the second operation voltage (Vdd2) supplied to the second operation voltage supply terminal (22) (see FIG. 5).

Figure 9:
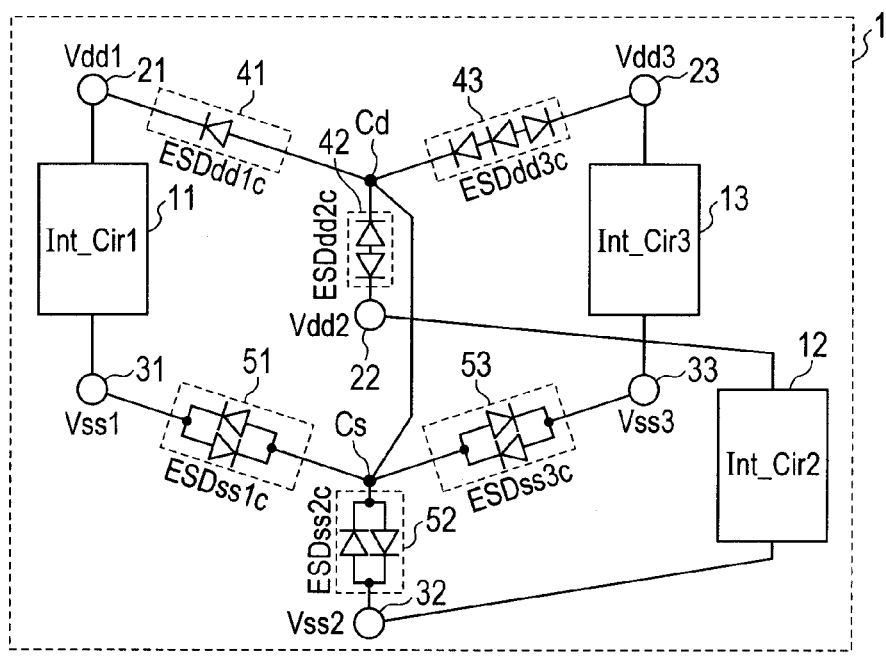
FIG. 9 is a diagram showing the configuration of a semiconductor integrated circuit 1 having three kinds of power voltages and three kinds of ground voltages, according to a third embodiment of the invention.

In a more preferred embodiment, the second operation potential difference by the second electrostatic discharge protection circuit (42) is set to a larger value than the first operation potential difference by the first electrostatic discharge protection circuit (41), and the third operation potential difference by the third electrostatic discharge protection circuit (43) is set to a larger value than the second operation potential difference by the second electrostatic discharge protection circuit (42) (see FIG. 9).

In another more preferred embodiment, the coupling midpoint (Cd) is electrically coupled to the ground potential point (Cs) through a power-to-ground electrostatic discharge protection circuit (6) (see FIG. 5).

In yet another more preferred embodiment, the coupling number of second voltage clamp elements included in the second electrostatic discharge protection circuit (42) is set to a larger value than the coupling number of first voltage clamp elements included in the first electrostatic discharge protection circuit (41), and the coupling number of third voltage clamp elements included in the third electrostatic discharge protection circuit (43) is set to a larger value than the coupling number of second voltage clamp elements included in the second electrostatic discharge protection circuit (42) (see FIG. 9).

In a specific embodiment, the first voltage clamp element included in the first electrostatic discharge protection circuit (41), the second voltage clamp element included in the second electrostatic discharge protection circuit (42), and the third voltage clamp element included in the third electrostatic discharge protection circuit (43) are PN junction diodes (see FIG. 9).

In a more specific embodiment, the first voltage clamp element included in the first electrostatic discharge protection circuit (41), the second voltage clamp element included in the second electrostatic discharge protection circuit (42), and the third voltage clamp element included in the third electrostatic discharge protection circuit (43) are transistors.

Figure 11:
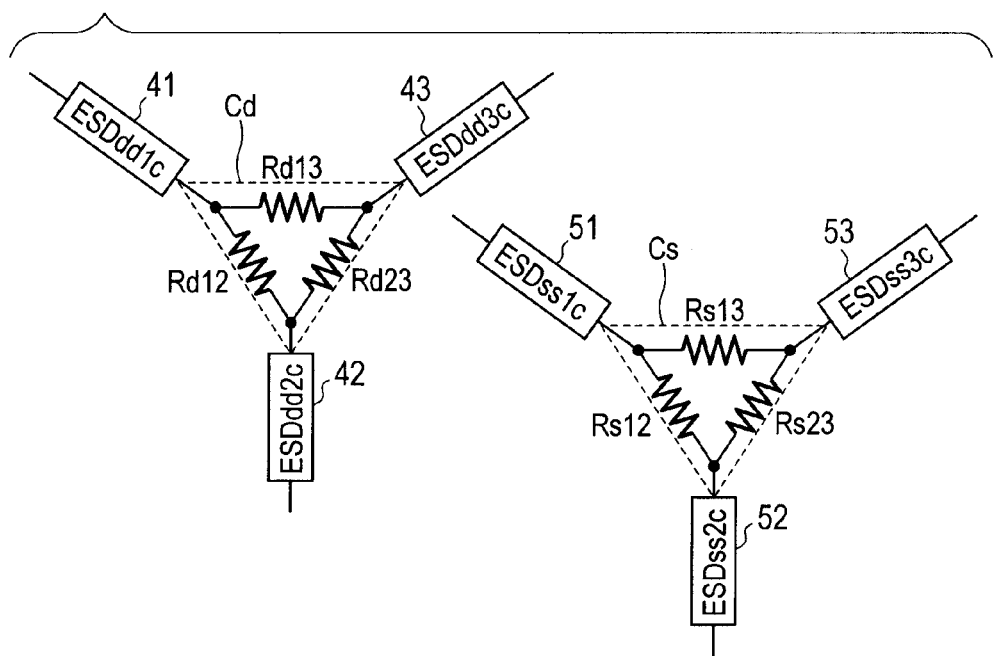
FIG. 11 is a diagram showing the configurations of a power side coupling midpoint Cd and a ground side coupling midpoint Cs in the semiconductor integrated circuit 1 described with reference to FIGS. 5, 7, and 9 according to the first and third embodiments of the invention.

In the most specific embodiment, the coupling midpoint (Cd) is configured with ring coupling of a plurality of current limiting elements (Rd12, Rd23, Rd13) (see FIG. 11).

[2] A semiconductor integrated circuit (1) according to another typical embodiment of the invention includes a first power voltage supply terminal (21), a second power voltage supply terminal (22), a third power voltage supply terminal (23), a first ground voltage supply terminal (31), a second ground voltage supply terminal (32), a third ground voltage supply terminal (33), a first internal circuit (11), a second internal circuit (12), a third internal circuit (13), a first power side electrostatic discharge protection circuit (41), second power side electrostatic discharge protection circuit (42), a third power side electrostatic discharge protection circuit (43), a first ground side electrostatic discharge protection circuit (51), a second ground side electrostatic discharge protection circuit (52), a third ground side electrostatic discharge protection circuit (53), a power side coupling midpoint (Cd), and a ground side coupling midpoint (Cs).

The first internal circuit (11) can operate at a first power voltage (Vdd1) and a first ground voltage (Vss1) supplied through the first power voltage supply terminal (21) and the first ground voltage supply terminal (31) respectively, the second internal circuit (12) can operate at a second power voltage (Vdd2) and a second ground voltage (Vss2) supplied through the second power voltage supply terminal (22) and the second ground voltage supply terminal (32) respectively, and the third internal circuit (13) can operate at a third power voltage (Vdd3) and a third ground voltage (Vss3) supplied through the third power voltage supply terminal (23) and the third ground voltage supply terminal (33) respectively.

The first power side electrostatic discharge protection circuit (41) is coupled between the first power voltage supply terminal (21) and the power side coupling midpoint (Cd), the second power side electrostatic discharge protection circuit (42) is coupled between the second power voltage supply terminal (22) and the power side coupling midpoint (Cd), and the third power side electrostatic discharge protection circuit (43) is coupled between the third power voltage supply terminal (23) and the power side coupling midpoint (Cd).

The first ground side electrostatic discharge protection circuit (51) is coupled between the first ground voltage supply terminal (31) and the ground side coupling midpoint (Cs), the second ground side electrostatic discharge protection circuit (52) is coupled between the second ground voltage supply terminal (32) and the ground side coupling midpoint (Cs), and the third ground side electrostatic discharge protection circuit (53) is coupled between the third ground voltage supply terminal (33) and the ground side coupling midpoint (Cs) (see FIG. 5).

According to this embodiment, it is possible to reduce an increase in the number of electrostatic discharge protection circuits or the number of electrostatic discharge protection elements due to increases in the number of separations of power voltages and the number of separations of ground voltages.

In a preferred embodiment, the first power side electrostatic discharge protection circuit (41) includes a first power side voltage clamp element for clamping an increased potential difference between the first power voltage supply terminal (21) and the power side coupling midpoint (Cd) to a first power side potential difference, the second power side electrostatic discharge protection circuit (42) includes a second power side voltage clamp element for clamping an increased potential difference between the second power voltage supply terminal (22) and the power side coupling midpoint (Cd) to a second power side potential difference, and the third power side electrostatic discharge protection circuit (43) includes a third power side voltage clamp element for clamping an increased potential difference between the third power voltage supply terminal (23) and the power side coupling midpoint (Cd) to a third power side potential difference.

The first ground side electrostatic discharge protection circuit (51) includes a first ground side voltage clamp element for clamping an increased potential difference between the first ground voltage supply terminal (31) and the ground side coupling midpoint (Cs) to a first ground side potential difference, the second ground side electrostatic discharge protection circuit (52) includes a second ground side voltage clamp element for clamping an increased potential difference between the second ground voltage supply terminal (32) and the ground side coupling midpoint (Cs) to a second ground side potential difference, and the third ground side electrostatic discharge protection circuit (53) includes a third ground side voltage clamp element for clamping an increased potential difference between the third ground voltage supply terminal (33) and the ground side coupling midpoint (Cs) to a third ground side potential difference (see FIG. 7).

In another preferred embodiment, the power side coupling midpoint (Cd) is electrically coupled to the ground side coupling midpoint (Cs) through a current path (see FIG. 5).

In yet another preferred embodiment, the first internal circuit (11) includes the most miniaturized transistor in the semiconductor integrated circuit (1), the second internal circuit (12) includes the second most miniaturized transistor in the semiconductor integrated circuit (1), and the third internal circuit (13) includes the third most miniaturized transistor in the semiconductor integrated circuit (1).

A voltage level of the second power voltage (Vdd2) supplied to the second power voltage supply terminal (22) is set to a higher level than a voltage level of the first power voltage (Vdd1) supplied to the first power voltage supply terminal (21), and a voltage level of the third power voltage (Vdd3) supplied to the third power voltage supply terminal (23) is set to a higher level than the voltage level of the second power voltage (Vdd2) supplied to the second power voltage supply terminal (22) (see FIG. 5).

In a more preferred embodiment, the second power side potential difference by the second power side electrostatic discharge protection circuit (42) is set to a larger value than the first power side potential difference by the first power side electrostatic discharge protection circuit (41), and the third power side potential difference by the third power side electrostatic discharge protection circuit (43) is set to a larger value than the second power side potential difference by the second power side electrostatic discharge protection circuit (42) (see FIG. 9).

In another more preferred embodiment, the power side coupling midpoint (Cd) is electrically coupled to the ground side coupling midpoint (Cs) through a power-to-ground electrostatic discharge protection circuit (6) (see FIG. 5).

In yet another more preferred embodiment, the coupling number of second power side voltage clamp elements included in the second power side electrostatic discharge protection circuit (42) is set to a larger value than the coupling number of first power side voltage clamp elements included in the first power side electrostatic discharge protection circuit (41), and the coupling number of third power side voltage clamp elements included in the third power side electrostatic discharge protection circuit (43) is set to a larger value than the coupling number of second power side voltage clamp elements included in the second power side electrostatic discharge protection circuit (42) (see FIG. 9).

In a specific embodiment, the first power side voltage clamp element included in the first power side electrostatic discharge protection circuit (41), the second power side voltage clamp element included in the second power side electrostatic discharge protection circuit (42), the third power side voltage clamp element included in the third power side electrostatic discharge protection circuit (43), the first ground side voltage clamp element included in the first ground side electrostatic discharge protection circuit (51), the second ground side voltage clamp element included in the second ground side electrostatic discharge protection circuit (52), and the third ground side voltage clamp element included in the third ground side electrostatic discharge protection circuit (53) are PN junction diodes (see FIG. 9).

In a more specific embodiment, the first power side voltage clamp element included in the first power side electrostatic discharge protection circuit (41), the second power side voltage clamp element included in the second power side electrostatic discharge protection circuit (42), the third power side voltage clamp element included in the third power side electrostatic discharge protection circuit (43), the first ground side voltage clamp element included in the first ground side electrostatic discharge protection circuit (51), the second ground side voltage clamp element included in the second ground side electrostatic discharge protection circuit (52), and the third ground side voltage clamp element included in the third ground side electrostatic discharge protection circuit (53) are transistors.

In the most specific embodiment, the power side coupling midpoint (Cd) is configured with ring coupling of a plurality of power side current limiting elements (Rd12, Rd23, Rd13), and the ground side coupling midpoint (Cs) is configured with ring coupling of a plurality of ground side current limiting elements (Rs12, Rs23, Rs13) (see FIG. 11).

2. Details of Embodiments

Next, embodiments will be described in greater detail below. In all the drawings for illustrating the best mode for carrying out the invention, components having the same functions as in the foregoing drawings are denoted by the same reference numerals, and their description will not be repeated.

First Embodiment

Configuration of Semiconductor Integrated Circuit According to First Embodiment

FIG. 5 is a diagram showing the configuration of a semiconductor integrated circuit 1 having three kinds of power voltages and three kinds of ground voltages, according to a first embodiment of the invention. The semiconductor integrated circuit 1 is a monolithic semiconductor integrated circuit in which many internal circuits are integrated in a silicon semiconductor chip.

A major feature of the semiconductor integrated circuit 1 shown in FIG. 5 is the Y (star) coupling of a first power side electrostatic discharge protection circuit 41, a second power side electrostatic discharge protection circuit 42, and a third power side electrostatic discharge protection circuit 43 or a first ground side electrostatic discharge protection circuit 51, a second ground side electrostatic discharge protection circuit 52, and a third ground side electrostatic discharge protection circuit 53 instead of the past Δ (delta) coupling. The Δ (delta)-Y (star) transformation makes it possible to reduce an increase in the number of electrostatic discharge protection circuits or the number of electrostatic discharge protection elements.

The semiconductor integrated circuit 1 shown in FIG. 5 includes a first internal circuit 11, a second internal circuit 12, and a third internal circuit 13. Further, the semiconductor integrated circuit 1 shown in FIG. 5 includes a first power voltage supply terminal 21, a second power voltage supply terminal 22, a third power voltage supply terminal 23, a first ground voltage supply terminal 31, a second ground voltage supply terminal 32, and a third ground voltage supply terminal 33.

A first power voltage Vdd1 from outside the semiconductor integrated circuit 1 can be supplied to the first power voltage supply terminal 21. A first ground voltage Vss1 from outside the semiconductor integrated circuit 1 can be supplied to the first ground voltage supply terminal 31. The first internal circuit 11 can operate at the potential difference between the first power voltage Vdd1 and the first ground voltage Vss1. Though not limited in particular, the first power voltage Vdd1 is, e.g., 2.5 V, and the first internal circuit 11 is configured with a digital logic circuit such as a central processing unit (CPU) configured with miniaturized transistors formed by a miniaturized semiconductor process and an SRAM and a memory circuit configured with miniaturized transistors. The first power voltage Vdd1 set to the lowest voltage level is supplied to the first internal circuit 11 containing transistors formed by the most miniaturized semiconductor process in the semiconductor integrated circuit 1.

A second power voltage Vdd2 from outside the semiconductor integrated circuit 1 can be supplied to the second power voltage supply terminal 22. A second ground voltage Vss2 from outside the semiconductor integrated circuit 1 can be supplied to the second ground voltage supply terminal 32. The second internal circuit 12 can operate at the potential difference between the second power voltage Vdd2 and the second ground voltage Vss2. Though not limited in particular, the second power voltage Vdd2 is, e.g., 3 V, and the second internal circuit 12 is a circuit such as an input/output circuit (I/O circuit) formed by the second most miniaturized semiconductor process. The input/output circuit (I/O circuit) inputs and outputs input/output signals of a relatively high voltage level with the outside of the semiconductor integrated circuit. The second power voltage Vdd2 set to the second highest voltage level is supplied to the second internal circuit 12 containing transistors formed by the second most miniaturized semiconductor process in the semiconductor integrated circuit 1.

A third power voltage Vdd3 from outside the semiconductor integrated circuit 1 can be supplied to the third power voltage supply terminal 23. A third ground voltage Vss3 from outside the semiconductor integrated circuit 1 can be supplied to the third ground voltage supply terminal 33. The third internal circuit 13 can operate at the potential difference between the third power voltage Vdd3 and the third ground voltage Vss3. Though not limited in particular, the third power voltage Vdd3 is, e.g., 5 V, and the third internal circuit 13 is a high-voltage circuit such as a nonvolatile flash memory to which high write and erase voltages are applied and an analog circuit such as an analog/digital converter and a digital/analog converter containing transistors formed by the third most miniaturized semiconductor process. Accordingly, the third power voltage Vdd3 set to the highest voltage level is supplied to the high-voltage circuit.

In the case of an integrated circuit for an automotive power train, for example, the first power voltage Vdd1 is approximately 5 V which is supplied to internal low-voltage components, the second power voltage Vdd2 is approximately 14 V which is a battery voltage, and the third power voltage Vdd3 is tens of volts obtained by boosting the battery voltage which are supplied to internal high-voltage components.

The first power side electrostatic discharge protection circuit 41 is coupled between the first power voltage supply terminal 21 and a power side coupling midpoint Cd. The first power side electrostatic discharge protection circuit 41 prevents an excessive external surge voltage from being applied to the first internal circuit 11 by clamping an increased potential difference between the first power voltage supply terminal 21 and the power side coupling midpoint Cd to a first predetermined power side potential difference.

The second power side electrostatic discharge protection circuit 42 is coupled between the second power voltage supply terminal 22 and the power side coupling midpoint Cd. The second power side electrostatic discharge protection circuit 42 prevents an excessive external surge voltage from being applied to the second internal circuit 12 by clamping an increased potential difference between the second power voltage supply terminal 22 and the power side coupling midpoint Cd to a second predetermined power side potential difference.

The third power side electrostatic discharge protection circuit 43 is coupled between the third power voltage supply terminal 23 and the power side coupling midpoint Cd. The third power side electrostatic discharge protection circuit 43 prevents an excessive external surge voltage from being applied to the third internal circuit 13 by clamping an increased potential difference between the third power voltage supply terminal 23 and the power side coupling midpoint Cd to a third predetermined power side potential difference.

The first ground side electrostatic discharge protection circuit 51 is coupled between the first ground voltage supply terminal 31 and a ground side coupling midpoint Cs. The first ground side electrostatic discharge protection circuit 51 prevents an excessive external surge voltage from being applied to the first internal circuit 11 by clamping an increased potential difference between the first ground voltage supply terminal 31 and the ground side coupling midpoint Cs to a first predetermined ground side potential difference.

The second ground side electrostatic discharge protection circuit 52 is coupled between the second ground voltage supply terminal 32 and the ground side coupling midpoint Cs. The second ground side electrostatic discharge protection circuit 52 prevents an excessive external surge voltage from being applied to the second internal circuit 12 by clamping an increased potential difference between the second ground voltage supply terminal 32 and the ground side coupling midpoint Cs to a second predetermined ground side potential difference.

The third ground side electrostatic discharge protection circuit 53 is coupled between the third ground voltage supply terminal 33 and the ground side coupling midpoint Cs. The third ground side electrostatic discharge protection circuit 53 prevents an excessive external surge voltage from being applied to the third internal circuit 13 by clamping an increased potential difference between the third ground voltage supply terminal 33 and the ground side coupling midpoint Cs to a third predetermined ground side potential difference.

Further, a power-to-ground electrostatic discharge protection circuit 6 is coupled between the power side coupling midpoint Cd and the ground side coupling midpoint Cs. The power-to-ground electrostatic discharge protection circuit 6 prevents an excessive external surge voltage from being applied to the first, second, and third internal circuits 11, 12, and 13 by clamping an increased potential difference between the power side coupling midpoint Cd and the ground side coupling midpoint Cs to a predetermined power-ground potential difference.

As can be seen in FIG. 5, the total number of electrostatic discharge protection circuits included in the semiconductor integrated circuit 1 having three kinds of power voltages and three kinds of ground voltages according to the first embodiment of the invention is 7.

FIG. 7 is a diagram showing the configurations of the first power side electrostatic discharge protection circuit 41, the second power side electrostatic discharge protection circuit 42, the third power side electrostatic discharge protection circuit 43, the first ground side electrostatic discharge protection circuit 51, the second ground side electrostatic discharge protection circuit 52, and the third ground side electrostatic discharge protection circuit 53 included in the semiconductor integrated circuit 1 having three kinds of power voltages and three kinds of ground voltages according to the first embodiment of the invention, shown in FIG. 5.

As shown in FIG. 7, the first power side electrostatic discharge protection circuit 41, the second power side electrostatic discharge protection circuit 42, and the third power side electrostatic discharge protection circuit 43 are configured with three PN junction diodes whose anodes are coupled to the power side coupling midpoint Cd and whose cathodes are coupled to the first power voltage supply terminal 21, the second power voltage supply terminal 22, and the third power voltage supply terminal 23 respectively. Therefore, the first, second, and third predetermined power side clamp potential difference is the reverse breakdown voltage BV of a PN junction diode.

As shown in FIG. 7, each of the first ground side electrostatic discharge protection circuit 51, the second ground side electrostatic discharge protection circuit 52, and the third ground side electrostatic discharge protection circuit 53 is configured with two PN junction diodes parallel-coupled in a mutually opposite direction between the ground side coupling midpoint Cs and the first ground voltage supply terminal 31, the second ground voltage supply terminal 32, or the third ground voltage supply terminal 33. Therefore, the first, second, and third predetermined ground side clamp potential difference is the forward voltage Vf of a PN junction diode.

As can be seen in FIG. 7, the total number of PN junction diodes in all the electrostatic discharge protection circuits included in the semiconductor integrated circuit 1 having three kinds of power voltages and three kinds of ground voltages according to the first embodiment of the invention is 10.

Second Embodiment

Figure 6:
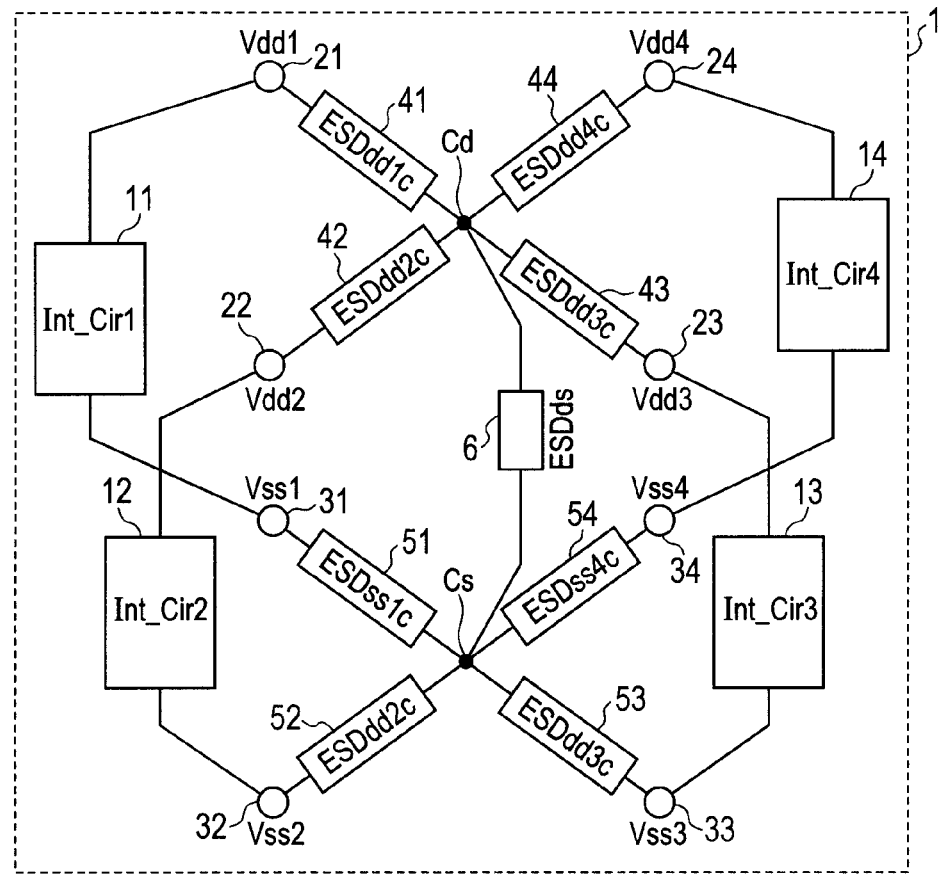
FIG. 6 is a diagram showing the configuration of a semiconductor integrated circuit 1 having four kinds of power voltages and four kinds of ground voltages, according to a second embodiment of the invention.

Configuration of Semiconductor Integrated Circuit According to Second Embodiment FIG. 6 is a diagram showing the configuration of a semiconductor integrated circuit 1 having four kinds of power voltages and four kinds of ground voltages, according to a second embodiment of the invention.

The semiconductor integrated circuit 1 having four kinds of power voltages and four kinds of ground voltages according to the second embodiment of the invention shown in FIG. 6 differs in the following respects from the semiconductor integrated circuit 1 according to the first embodiment of the invention shown in FIG. 5.

That is, the semiconductor integrated circuit 1 according to the second embodiment of the invention shown in FIG. 6 further includes a fourth internal circuit 14, a fourth power voltage supply terminal 24, a fourth ground voltage supply terminal 34, a fourth power side electrostatic discharge protection circuit 44, and a fourth ground side electrostatic discharge protection circuit 54.

The fourth power side electrostatic discharge protection circuit 44 is coupled between the fourth power voltage supply terminal 24 and the power side coupling midpoint Cd. The fourth power side electrostatic discharge protection circuit 44 prevents an excessive external surge voltage from being applied to the fourth internal circuit 14 by clamping an increased potential difference between the fourth power voltage supply terminal 24 and the power side coupling midpoint Cd to a fourth predetermined power side potential difference.

The fourth ground side electrostatic discharge protection circuit 54 is coupled between the fourth ground voltage supply terminal 34 and the ground side coupling midpoint Cs. The fourth ground side electrostatic discharge protection circuit 54 prevents an excessive external surge voltage from being applied to the fourth internal circuit 14 by clamping an increased potential difference between the fourth ground voltage supply terminal 34 and the ground side coupling midpoint Cs to a fourth predetermined ground side potential difference.

As can be seen in FIG. 6, the total number of electrostatic discharge protection circuits included in the semiconductor integrated circuit 1 having four kinds of power voltages and four kinds of ground voltages according to the second embodiment of the invention is 9.

Figure 8:
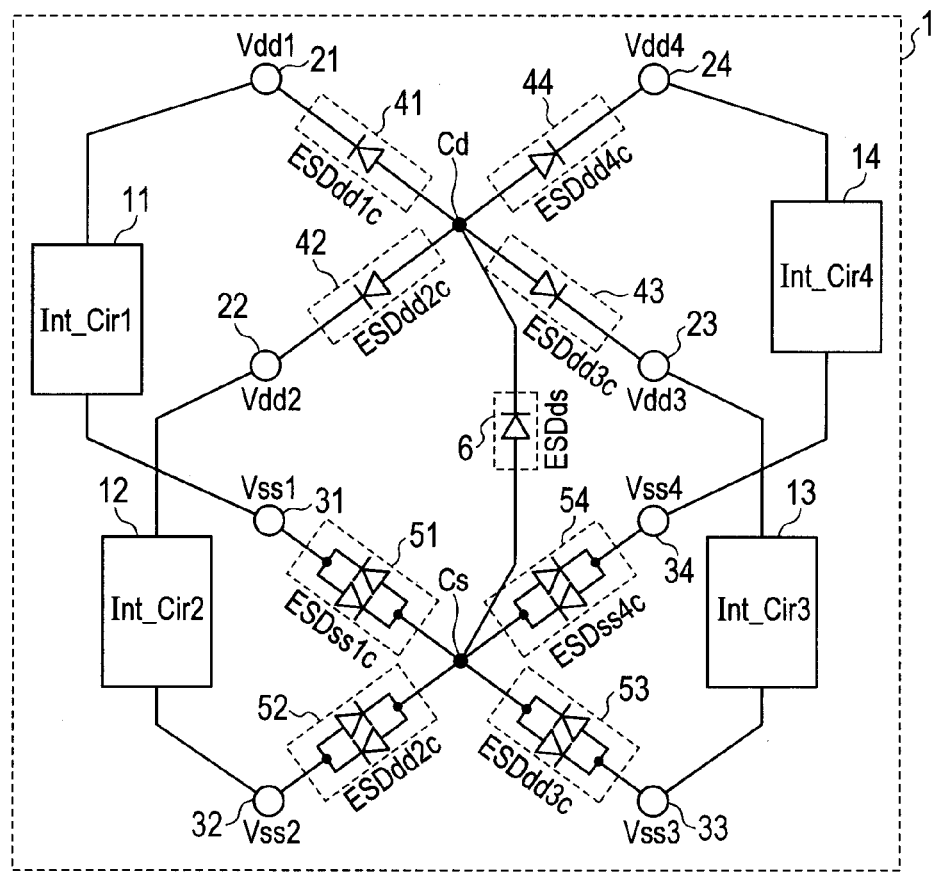
FIG. 8 is a diagram showing the configurations of a fourth power side electrostatic discharge protection circuit 44 and a fourth ground side electrostatic discharge protection circuit 54 added to the semiconductor integrated circuit 1 having three kinds of power voltages and three kinds of ground voltages according to the first embodiment of the invention shown in FIG. 7.

FIG. 8 is a diagram showing the configurations of the fourth power side electrostatic discharge protection circuit 44 and the fourth ground side electrostatic discharge protection circuit 54 added to the semiconductor integrated circuit 1 having three kinds of power voltages and three kinds of ground voltages according to the first embodiment of the invention shown in FIG. 7.

As shown in FIG. 8, the fourth power side electrostatic discharge protection circuit 44 is configured with a PN junction diode whose anode is coupled to the power side coupling midpoint Cd and whose cathode is coupled to the fourth power voltage supply terminal 24. Therefore, the fourth predetermined power side clamp potential difference is the reverse breakdown voltage BV of the PN junction diode.

As shown in FIG. 8, the fourth ground side electrostatic discharge protection circuit 54 is configured with two PN junction diodes parallel-coupled in a mutually opposite direction between the ground side coupling midpoint Cs and the fourth ground voltage supply terminal 34. Therefore, the fourth predetermined ground side clamp potential difference is the forward voltage Vf of a PN junction diode.

As can be seen in FIG. 8, the total number of PN junction diodes in all the electrostatic discharge protection circuits included in the semiconductor integrated circuit 1 having four kinds of power voltages and four kinds of ground voltages according to the second embodiment of the invention is 13.

Third Embodiment

Configuration of Semiconductor Integrated Circuit According to Third Embodiment FIG. 9 is a diagram showing the configuration of a semiconductor integrated circuit 1 having three kinds of power voltages and three kinds of ground voltages, according to a third embodiment of the invention.

The semiconductor integrated circuit 1 having three kinds of power voltages and three kinds of ground voltages according to the third embodiment of the invention shown in FIG. 9 differs in the following respects from the semiconductor integrated circuit 1 according to the first embodiment of the invention shown in FIGS. 5 and 7.

That is, in the semiconductor integrated circuit 1 according to the third embodiment of the invention shown in FIG. 9, the power-to-ground electrostatic discharge protection circuit 6 coupled between the power side coupling midpoint Cd and the ground side coupling midpoint Cs is removed, and the power side coupling midpoint Cd and the ground side coupling midpoint Cs are short-circuited with a metal wire.

Further, in the second power side electrostatic discharge protection circuit 42 in the semiconductor integrated circuit 1 according to the third embodiment of the invention shown in FIG. 9, one PN junction diode is added between the anode of the PN junction diode whose cathode is coupled to the second power voltage supply terminal 22 and the power side coupling midpoint Cd. The addition of the one PN junction diode responds to the supply of the second power voltage Vdd2 set to 3 V which is the second highest voltage level in the semiconductor integrated circuit 1 to the second power voltage supply terminal 22. Accordingly, the second power side clamp potential difference by the second power side electrostatic discharge protection circuit 42 is set to a higher potential difference than the first power side clamp potential difference by the first power side electrostatic discharge protection circuit 41.

Furthermore, in the third power side electrostatic discharge protection circuit 43 in the semiconductor integrated circuit 1 according to the third embodiment of the invention shown in FIG. 9, two PN junction diodes in series are added between the anode of the PN junction diode whose cathode is coupled to the third power voltage supply terminal 23 and the power side coupling midpoint Cd. The addition of the two PN junction diodes in series responds to the supply of the third power voltage Vdd3 set to 5 V which is the highest voltage level in the semiconductor integrated circuit 1 to the third power voltage supply terminal 23. Accordingly, the third power side clamp potential difference by the third power side electrostatic discharge protection circuit 43 is set to a higher potential difference than the second power side clamp potential difference by the second power side electrostatic discharge protection circuit 42.

Fourth Embodiment

Figure 10:
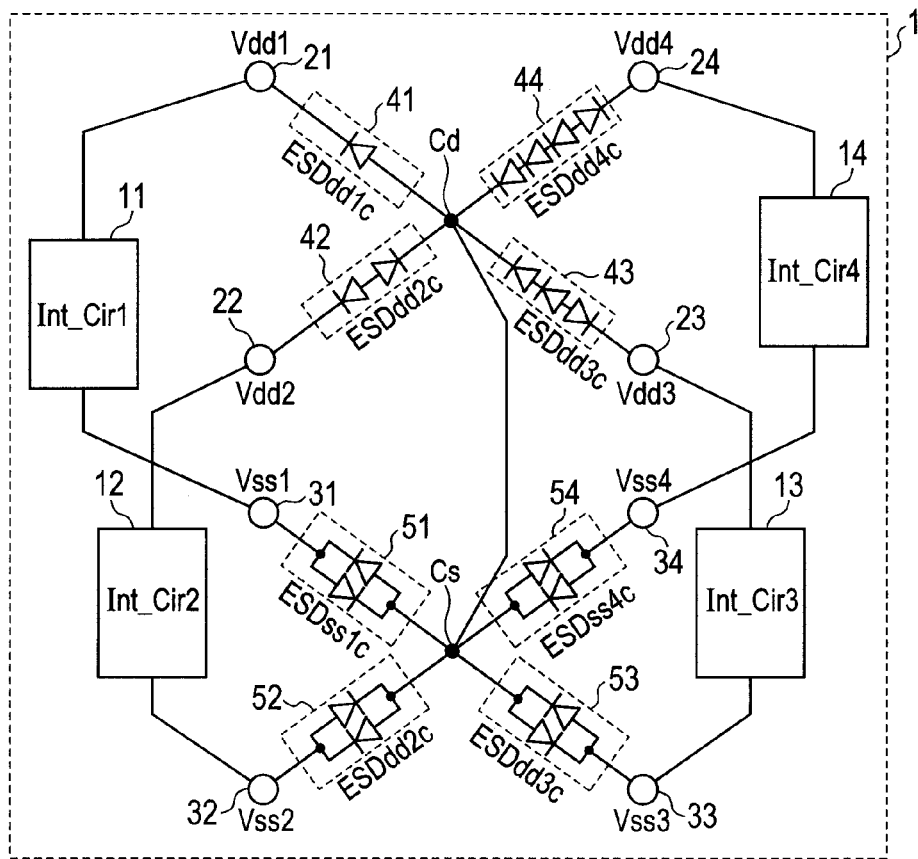
FIG. 10 is a diagram showing the configuration of a semiconductor integrated circuit 1 having four kinds of power voltages and four kinds of ground voltages, according to a fourth embodiment of the invention.

Configuration of Semiconductor Integrated Circuit According to Fourth Embodiment FIG. 10 is a diagram showing the configuration of a semiconductor integrated circuit 1 having four kinds of power voltages and four kinds of ground voltages, according to a fourth embodiment of the invention.

The semiconductor integrated circuit 1 having four kinds of power voltages and four kinds of ground voltages according to the fourth embodiment of the invention shown in FIG. 10 differs in the following respects from the semiconductor integrated circuit 1 according to the third embodiment of the invention shown in FIG. 9.

That is, the semiconductor integrated circuit 1 according to the fourth embodiment of the invention shown in FIG. 10 further includes a fourth internal circuit 14, a fourth power voltage supply terminal 24, a fourth ground voltage supply terminal 34, a fourth power side electrostatic discharge protection circuit 44, and a fourth ground side electrostatic discharge protection circuit 54. Further, a fourth power voltage Vdd4 of about 10 V exceeding 5 V is supplied to the fourth power voltage supply terminal 24.

Further, in the fourth power side electrostatic discharge protection circuit 44 in the semiconductor integrated circuit 1 according to the fourth embodiment of the invention shown in FIG. 10, three PN junction diodes in series are added between the anode of the PN junction diode whose cathode is coupled to the fourth power voltage supply terminal 24 and the power side coupling midpoint Cd. Since the fourth power voltage Vdd4 set to about 10 V in the semiconductor integrated circuit 1 is supplied to the fourth power voltage supply terminal 24, the three PN junction diodes in series are added. Therefore, the fourth power side clamp potential difference by the fourth power side electrostatic discharge protection circuit 44 is set to a higher potential difference than the third power side clamp potential difference by the third power side electrostatic discharge protection circuit 43.

Fifth Embodiment

Configuration of Semiconductor Integrated Circuit According to Fifth Embodiment FIG. 11 is a diagram showing the configurations of the power side coupling midpoint Cd and the ground side coupling midpoint Cs in the semiconductor integrated circuit 1 described with reference to FIGS. 5, 7, and 9 according to the first and third embodiments of the invention.

Each of the power side coupling midpoint Cd and the ground side coupling midpoint Cs shown in FIG. 11 functions as substantial one point, not literal one point.

The first power side electrostatic discharge protection circuit 41, the second power side electrostatic discharge protection circuit 42, the third power side electrostatic discharge protection circuit 43, and the Δ (delta) coupling of resistors Rd12, Rd23, and Rd13 substantially form the power side coupling midpoint Cd of the Y (star) coupling. In particular, the three resistors Rd12, Rd23, and Rd13 configuring the Δ (delta) coupling at the power side coupling midpoint Cd reduce a surge current into the electrostatic discharge protection circuits 41, 42, and 43 during the application of an external surge voltage.

The first ground side electrostatic discharge protection circuit 51, the second ground side electrostatic discharge protection circuit 52, the third ground side electrostatic discharge protection circuit 53, and the Δ (delta) coupling of resistors Rs12, Rs23, and Rs13 substantially form the ground side coupling midpoint Cs of the Y (star) coupling. In particular, the three resistors Rs12, Rs23, and Rs13 configuring the Δ (delta) coupling at the ground side coupling midpoint Cs reduce a surge current into the electrostatic discharge protection circuits 51, 52, and 53 during the application of an external surge voltage.

Sixth Embodiment

Figure 12:
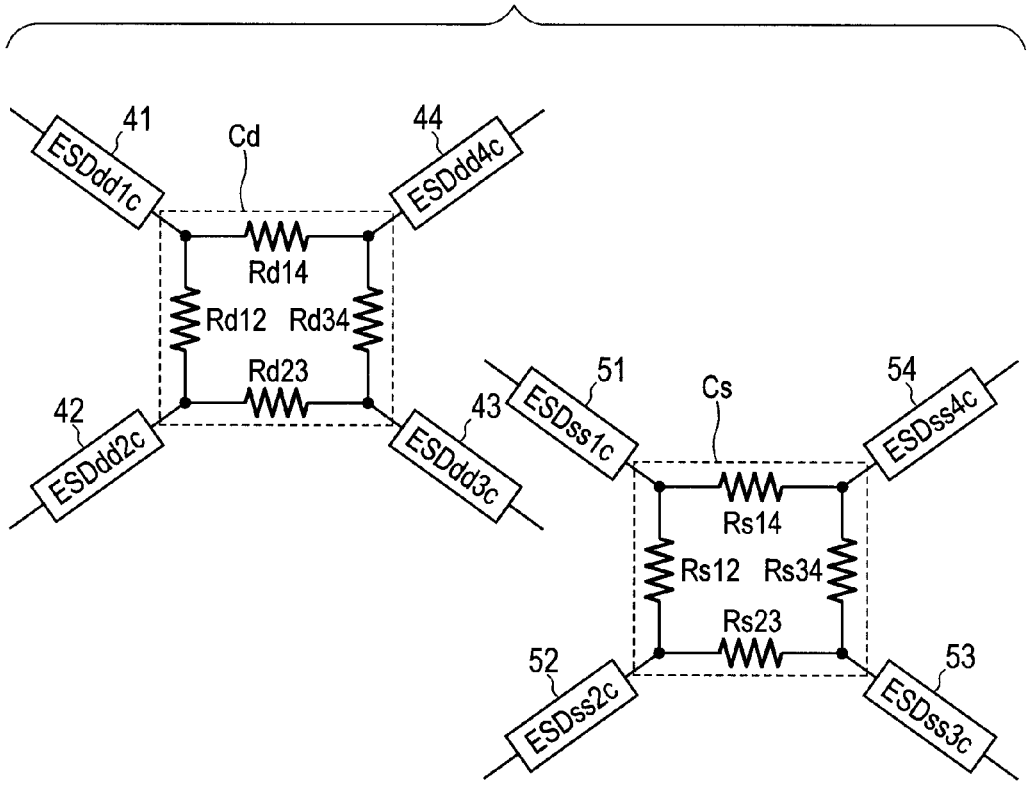
FIG. 12 is a diagram showing the configurations of a power side coupling midpoint Cd and a ground side coupling midpoint Cs in the semiconductor integrated circuit 1 described with reference to FIGS. 6, 8, and 10 according to the second and fourth embodiments of the invention.

Configuration of Semiconductor Integrated Circuit According to Sixth Embodiment FIG. 12 is a diagram showing the configurations of the power side coupling midpoint Cd and the ground side coupling midpoint Cs in the semiconductor integrated circuit 1 described with reference to FIGS. 6, 8, and 10 according to the second and fourth embodiments of the invention.

Each of the power side coupling midpoint Cd and the ground side coupling midpoint Cs shown in FIG. 12 functions as substantial one point, not literal one point.

The first power side electrostatic discharge protection circuit 41, the second power side electrostatic discharge protection circuit 42, the third power side electrostatic discharge protection circuit 43, the fourth power side electrostatic discharge protection circuit 44, and the Δ (delta) coupling of resistors Rd12, Rd23, Rd34, and Rd14 substantially form the power side coupling midpoint Cd of the Y (star) coupling. In particular, the four resistors Rd12, Rd23, Rd34, and Rd14 configuring the Δ (delta) coupling at the power side coupling midpoint Cd reduce a surge current into the electrostatic discharge protection circuits 41, 42, 43, and 44 during the application of an external surge voltage.

The first ground side electrostatic discharge protection circuit 51, the second ground side electrostatic discharge protection circuit 52, the third ground side electrostatic discharge protection circuit 53, the fourth ground side electrostatic discharge protection circuit 54, and the Δ (delta) coupling of resistors Rs12, Rs23, Rs34, and Rs14 substantially form the ground side coupling midpoint Cs of the Y (star) coupling. In particular, the four resistors Rs12, Rs23, Rs34, and Rs14 configuring the Δ (delta) coupling at the ground side coupling midpoint Cs reduce a surge current into the electrostatic discharge protection circuits 51, 52, 53, and 54 during the application of an external surge voltage.

Seventh Embodiment

Figure 13:
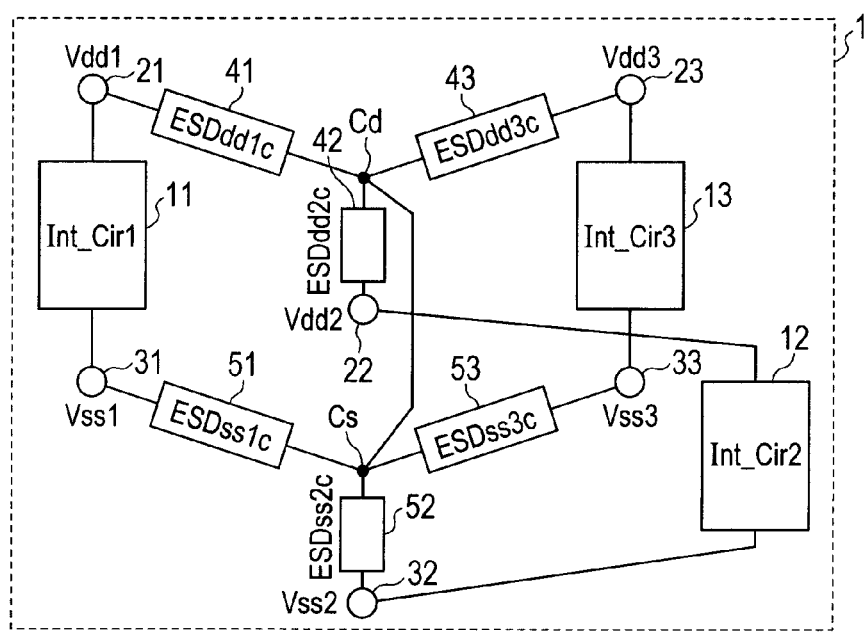
FIG. 13 is a diagram showing the configuration of a semiconductor integrated circuit 1 having three kinds of power voltages and three kinds of ground voltages, according to a seventh embodiment of the invention.

Configuration of Semiconductor Integrated Circuit According to Seventh Embodiment FIG. 13 is a diagram showing the configuration of a semiconductor integrated circuit 1 having three kinds of power voltages and three kinds of ground voltages, according to a seventh embodiment of the invention.

The semiconductor integrated circuit 1 having three kinds of power voltages and three kinds of ground voltages according to the seventh embodiment of the invention shown in FIG. 13 differs in the following respects from the semiconductor integrated circuit 1 according to the first embodiment of the invention shown in FIGS. 5 and 7.

That is, in the semiconductor integrated circuit 1 according to the seventh embodiment of the invention shown in FIG. 13, the power-to-ground electrostatic discharge protection circuit 6 coupled between the power side coupling midpoint Cd and the ground side coupling midpoint Cs is removed, and the power side coupling midpoint Cd and the ground side coupling midpoint Cs are short-circuited with a metal wire.

Figure 15:
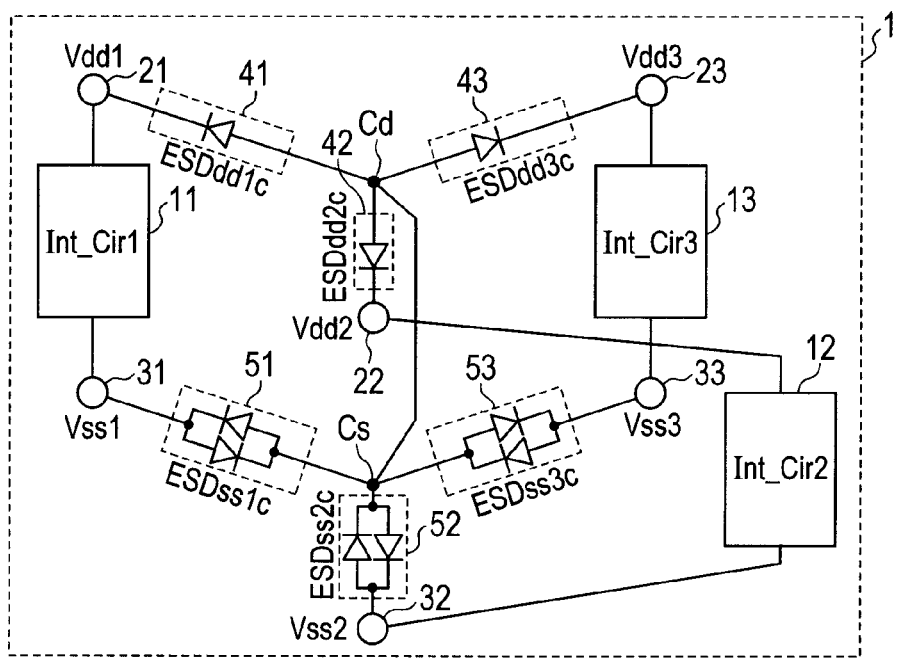
FIG. 15 is a diagram showing the configurations of the first power side electrostatic discharge protection circuit 41, the second power side electrostatic discharge protection circuit 42, the third power side electrostatic discharge protection circuit 43, the first ground side electrostatic discharge protection circuit 51, the second ground side electrostatic discharge protection circuit 52, and the third ground side electrostatic discharge protection circuit 53 included in the semiconductor integrated circuit 1 having three kinds of power voltages and three kinds of ground voltages according to the seventh embodiment of the invention, shown in FIG. 13.

FIG. 15 is a diagram showing the configurations of the first power side electrostatic discharge protection circuit 41, the second power side electrostatic discharge protection circuit 42, the third power side electrostatic discharge protection circuit 43, the first ground side electrostatic discharge protection circuit 51, the second ground side electrostatic discharge protection circuit 52, and the third ground side electrostatic discharge protection circuit 53 included in the semiconductor integrated circuit 1 having three kinds of power voltages and three kinds of ground voltages according to the seventh embodiment of the invention, shown in FIG. 13.

As shown in FIG. 15, the first power side electrostatic discharge protection circuit 41, the second power side electrostatic discharge protection circuit 42, and the third power side electrostatic discharge protection circuit 43 are configured with three PN junction diodes whose anodes are coupled to the power side coupling midpoint Cd and whose cathodes are coupled to the first power voltage supply terminal 21, the second power voltage supply terminal 22, and the third power voltage supply terminal 23 respectively. Therefore, the first, second, and third predetermined power side clamp potential difference is the reverse breakdown voltage BV of a PN junction diode.

As shown in FIG. 15, each of the first ground side electrostatic discharge protection circuit 51, the second ground side electrostatic discharge protection circuit 52, and the third ground side electrostatic discharge protection circuit 53 is configured with two PN junction diodes parallel-coupled in a mutually opposite direction between the ground side coupling midpoint Cs and the first ground voltage supply terminal 31, the second ground voltage supply terminal 32, or the third ground voltage supply terminal 33. Therefore, the first, second, and third predetermined ground side clamp potential difference is the forward voltage Vf of a PN junction diode.

As can be seen in FIG. 15, the total number of PN junction diodes in all the electrostatic discharge protection circuits included in the semiconductor integrated circuit 1 having three kinds of power voltages and three kinds of ground voltages according to the seventh embodiment of the invention is 9.

Eighth Embodiment

Figure 14:
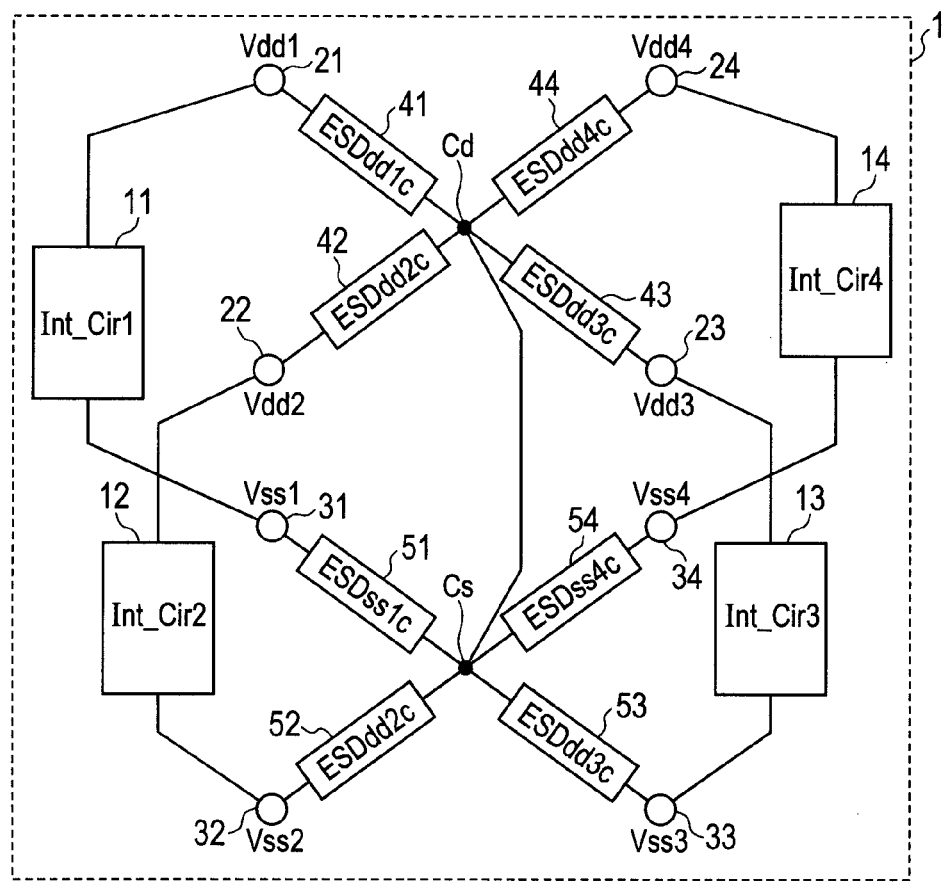
FIG. 14 is a diagram showing the configuration of a semiconductor integrated circuit 1 having four kinds of power voltages and four kinds of ground voltages, according to an eighth embodiment of the invention.

Configuration of Semiconductor Integrated Circuit According to Eighth Embodiment FIG. 14 is a diagram showing the configuration of a semiconductor integrated circuit 1 having four kinds of power voltages and four kinds of ground voltages, according to an eighth embodiment of the invention.

The semiconductor integrated circuit 1 having four kinds of power voltages and four kinds of ground voltages according to the eighth embodiment of the invention shown in FIG. 14 differs in the following respects from the semiconductor integrated circuit 1 according to the seventh embodiment of the invention shown in FIG. 13.

That is, the semiconductor integrated circuit 1 according to the eighth embodiment of the invention shown in FIG. 14 further includes a fourth internal circuit 14, a fourth power voltage supply terminal 24, a fourth ground voltage supply terminal 34, a fourth power side electrostatic discharge protection circuit 44, and a fourth ground side electrostatic discharge protection circuit 54. Further, a fourth power voltage Vdd4 of about 10 V or higher exceeding 5 V is supplied to the fourth power voltage supply terminal 24.

Figure 16:
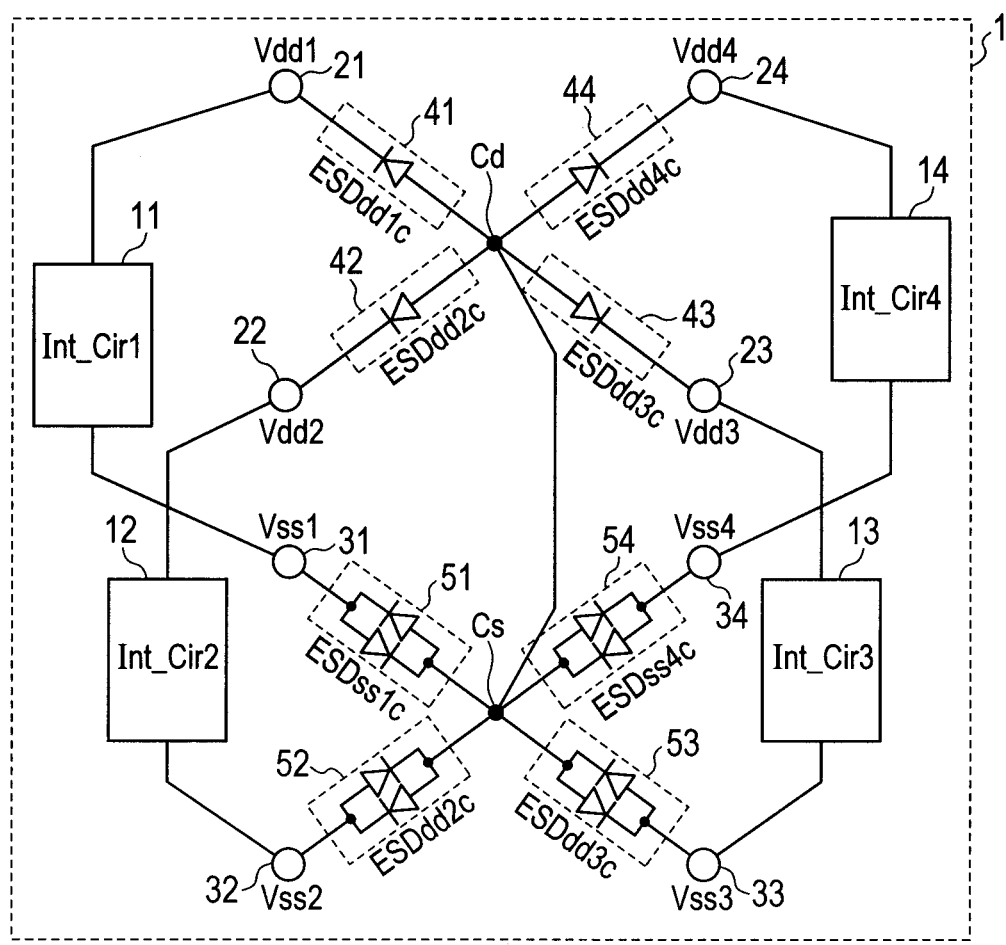
FIG. 16 is a diagram showing the configurations of a fourth power side electrostatic discharge protection circuit 44 and a fourth ground side electrostatic discharge protection circuit 54 additionally included in the semiconductor integrated circuit 1 having four kinds of power voltages and four kinds of ground voltages according to the eighth embodiment of the invention shown in FIG. 14.

FIG. 16 is a diagram showing the configurations of the fourth power side electrostatic discharge protection circuit 44 and the fourth ground side electrostatic discharge protection circuit 54 additionally included in the semiconductor integrated circuit 1 having four kinds of power voltages and four kinds of ground voltages according to the eighth embodiment of the invention shown in FIG. 14.

As shown in FIG. 16, the fourth power side electrostatic discharge protection circuit 44 is configured with a PN junction diode whose anode is coupled to the power side coupling midpoint Cd and whose cathode is coupled to the fourth power voltage supply terminal 24. Therefore, the fourth predetermined power side clamp potential difference is the reverse breakdown voltage BV of the PN junction diode.

As shown in FIG. 16, the fourth ground side electrostatic discharge protection circuit 54 is configured with two PN junction diodes parallel-coupled in a mutually opposite direction between the ground side coupling midpoint Cs and the fourth ground voltage supply terminal 34. Therefore, the fourth predetermined ground side clamp potential difference is the forward voltage Vf of a PN junction diode.

As can be seen in FIG. 16, the total number of PN junction diodes in all the electrostatic discharge protection circuits included in the semiconductor integrated circuit 1 having four kinds of power voltages and four kinds of ground voltages according to the eighth embodiment of the invention is 12.

While the invention made above by the present inventors has been described specifically based on the illustrated embodiments, the present invention is not limited thereto. It is needless to say that various changes and modifications can be made thereto without departing from the spirit and scope of the invention.

That is, while the power voltages and ground voltages up to four systems have been described in the above embodiments, it is needless to say that, similarly in the configuration of five or more systems, one terminal of each of ESD protection elements can be coupled to the respective power sources and the other terminal of each of the ESD protection elements can be coupled to the power side midpoint, and one terminal of each of ESD protection elements can be coupled to the respective ground points and the other terminal of each of the ESD protection elements can be coupled to the ground side midpoint.

Further, while specific power voltage values have been referred to in the above embodiments, it is needless to say that any other voltage values can be used.

For example, the semiconductor integrated circuit 1 can be applied not only to a semiconductor integrated circuit using a monolithic silicon semiconductor chip, but also to a semiconductor integrated circuit of a silicon-on-insulator (SOI) structure and a semiconductor integrated circuit using a compound semiconductor chip such as GaAs.

Further, the PN junction diode in the electrostatic discharge protection circuit according to the invention can be replaced with a voltage clamp element such as a diode-coupled MOS field-effect transistor with the gate and drain electrodes short-circuited.

Furthermore, it is needless to say that the semiconductor integrated circuit 1 according to the invention can also be applied to six or more internal circuits, six or more power voltage supply terminals, six or more ground voltage supply terminals, six or more power side electrostatic discharge protection circuits, and six or more ground side electrostatic discharge protection circuits.

What is claimed is:

1. A semiconductor integrated circuit comprising:
a first operation voltage supply terminal;
a second operation voltage supply terminal;
a third operation voltage supply terminal;
a first internal circuit;
a second internal circuit;
a third internal circuit;
a first electrostatic discharge protection circuit;
a second electrostatic discharge protection circuit;
a third electrostatic discharge protection circuit; and
a coupling midpoint,
wherein operation voltages of mutually different voltage levels can be supplied to the first, second, and third operation voltage supply terminals from outside the semiconductor integrated circuit,
wherein the first internal circuit can operate at a first operation voltage supplied through the first operation voltage supply terminal, the second internal circuit can operate at a second operation voltage supplied through the second operation voltage supply terminal, and the third internal circuit can operate at a third operation voltage supplied through the third operation voltage supply terminal, and
wherein the first electrostatic discharge protection circuit is coupled between the first operation voltage supply terminal and the coupling midpoint, the second electrostatic discharge protection circuit is coupled between the second operation voltage supply terminal and the coupling midpoint, and the third electrostatic discharge protection circuit is coupled between the third operation voltage supply terminal and the coupling midpoint.

2. The semiconductor integrated circuit according to claim 1, wherein the first electrostatic discharge protection circuit includes a first voltage clamp element for clamping an increased potential difference between the first operation voltage supply terminal and the coupling midpoint to a first operation potential difference, the second electrostatic discharge protection circuit includes a second voltage clamp element for clamping an increased potential difference between the second operation voltage supply terminal and the coupling midpoint to a second operation potential difference, and the third electrostatic discharge protection circuit includes a third voltage clamp element for clamping an increased potential difference between the third operation voltage supply terminal and the coupling midpoint to a third operation potential difference.

3. The semiconductor integrated circuit according to claim 2, wherein the coupling midpoint is electrically coupled to a ground potential point through a current path.

4. The semiconductor integrated circuit according to claim 3,
wherein the first internal circuit includes the most miniaturized transistor in the semiconductor integrated circuit, the second internal circuit includes the second most miniaturized transistor in the semiconductor integrated circuit, and the third internal circuit includes the third most miniaturized transistor in the semiconductor integrated circuit, and
wherein a voltage level of the second operation voltage supplied to the second operation voltage supply terminal is set to a higher level than a voltage level of the first operation voltage supplied to the first operation voltage supply terminal, and a voltage level of the third operation voltage supplied to the third operation voltage supply terminal is set to a higher level than the voltage level of the second operation voltage supplied to the second operation voltage supply terminal.

5. The semiconductor integrated circuit according to claim 4, wherein the second operation potential difference by the second electrostatic discharge protection circuit is set to a larger value than the first operation potential difference by the first electrostatic discharge protection circuit, and the third operation potential difference by the third electrostatic discharge protection circuit is set to a larger value than the second operation potential difference by the second electrostatic discharge protection circuit.

6. The semiconductor integrated circuit according to claim 5, wherein the coupling midpoint is electrically coupled to the ground potential point through a power-to-ground electrostatic discharge protection circuit.

7. The semiconductor integrated circuit according to claim 5, wherein the coupling number of second voltage clamp elements included in the second electrostatic discharge protection circuit is set to a larger value than the coupling number of first voltage clamp elements included in the first electrostatic discharge protection circuit, and the coupling number of third voltage clamp elements included in the third electrostatic discharge protection circuit is set to a larger value than the coupling number of second voltage clamp elements included in the second electrostatic discharge protection circuit.

8. The semiconductor integrated circuit according to claim 5, wherein the first voltage clamp element included in the first electrostatic discharge protection circuit, the second voltage clamp element included in the second electrostatic discharge protection circuit, and the third voltage clamp element included in the third electrostatic discharge protection circuit are PN junction diodes.

9. The semiconductor integrated circuit according to claim 5, wherein the first voltage clamp element included in the first electrostatic discharge protection circuit, the second voltage clamp element included in the second electrostatic discharge protection circuit, and the third voltage clamp element included in the third electrostatic discharge protection circuit are transistors.

10. The semiconductor integrated circuit according to claim 5, wherein the coupling midpoint is configured with ring coupling of a plurality of current limiting elements.

11. A semiconductor integrated circuit comprising:
a first power voltage supply terminal;
a second power voltage supply terminal;
a third power voltage supply terminal;
a first ground voltage supply terminal;
a second ground voltage supply terminal;
a third ground voltage supply terminal;
a first internal circuit;
a second internal circuit;
a third internal circuit;
a first power side electrostatic discharge protection circuit;
a second power side electrostatic discharge protection circuit;
a third power side electrostatic discharge protection circuit;
a first ground side electrostatic discharge protection circuit;
a second ground side electrostatic discharge protection circuit;
a third ground side electrostatic discharge protection circuit;
power side coupling midpoint; and
a ground side coupling midpoint,
wherein the first internal circuit can operate at a first power voltage and a first ground voltage supplied through the first power voltage supply terminal and the first ground voltage supply terminal respectively, the second internal circuit can operate at a second power voltage and a second ground voltage supplied through the second power voltage supply terminal and the second ground voltage supply terminal respectively, and the third internal circuit can operate at a third power voltage and a third ground voltage supplied through the third power voltage supply terminal and the third ground voltage supply terminal respectively,
wherein the first power side electrostatic discharge protection circuit is coupled between the first power voltage supply terminal and the power side coupling midpoint, the second power side electrostatic discharge protection circuit is coupled between the second power voltage supply terminal and the power side coupling midpoint, and the third power side electrostatic discharge protection circuit is coupled between the third power voltage supply terminal and the power side coupling midpoint, and wherein the first ground side electrostatic discharge protection circuit is coupled between the first ground voltage supply terminal and the ground side coupling midpoint, the second ground side electrostatic discharge protection circuit is coupled between the second ground voltage supply terminal and the ground side coupling midpoint, and the third ground side electrostatic discharge protection circuit is coupled between the third ground voltage supply terminal and the ground side coupling midpoint.

12. The semiconductor integrated circuit according to claim 11,
wherein the first power side electrostatic discharge protection circuit includes a first power side voltage clamp element for clamping an increased potential difference between the first power voltage supply terminal and the power side coupling midpoint to a first power side potential difference, the second power side electrostatic discharge protection circuit includes a second power side voltage clamp element for clamping an increased potential difference between the second power voltage supply terminal and the power side coupling midpoint to a second power side potential difference, and the third power side electrostatic discharge protection circuit includes a third power side voltage clamp element for clamping an increased potential difference between the third power voltage supply terminal and the power side coupling midpoint to a third power side potential difference, and
wherein the first ground side electrostatic discharge protection circuit includes a first ground side voltage clamp element for clamping an increased potential difference between the first ground voltage supply terminal and the ground side, coupling midpoint to a first ground side potential difference, the second ground side electrostatic discharge protection circuit includes a second ground side voltage clamp element for clamping an increased potential difference between the second ground voltage supply terminal and the ground side coupling midpoint to a second ground side potential difference, and the third ground side electrostatic discharge protection circuit includes a third ground side voltage clamp element for clamping an increased potential difference between the third ground voltage supply terminal and the ground side coupling midpoint to a third ground side potential difference.

13. The semiconductor integrated circuit according to claim 12, wherein the power side coupling midpoint is electrically coupled to the ground side coupling midpoint through a current path.

14. The semiconductor integrated circuit according to claim 13,
wherein the first internal circuit includes the most miniaturized transistor in the semiconductor integrated circuit, the second internal circuit includes the second most miniaturized transistor in the semiconductor integrated circuit, and the third internal circuit includes the third most miniaturized transistor in the semiconductor integrated circuit, and
wherein a voltage level of the second power voltage supplied to the second power voltage supply terminal is set to a higher level than a voltage level of the first power voltage supplied to the first power voltage supply terminal, and a voltage level of the third power voltage supplied to the third power voltage supply terminal is set to a higher level than the voltage level of the second power voltage supplied to the second power voltage supply terminal.

15. The semiconductor integrated circuit according to claim 14, wherein the second power side potential difference by the second power side electrostatic discharge protection circuit is set to a larger value than the first power side potential difference by the first power side electrostatic discharge protection circuit, and the third power side potential difference by the third power side electrostatic discharge protection circuit is set to a larger value than the second power side potential difference by the second power side electrostatic discharge protection circuit.

16. The semiconductor integrated circuit according to claim 15, wherein the power side coupling midpoint is electrically coupled to the ground side coupling midpoint through a power-to-ground electrostatic discharge protection circuit.

17. The semiconductor integrated circuit according to claim 15, wherein the coupling number of second power side voltage clamp elements included in the second power side electrostatic discharge protection circuit is set to a larger value than the coupling number of first power side voltage clamp elements included in the first power side electrostatic discharge protection circuit, and the coupling number of third power side voltage clamp elements included in the third power side electrostatic discharge protection circuit is set to a larger value than the coupling number of second power side voltage clamp elements included in the second power side electrostatic discharge protection circuit.

18. The semiconductor integrated circuit according to claim 15, wherein the first power side voltage clamp element included in the first power side electrostatic discharge protection circuit, the second power side voltage clamp element included in the second power side electrostatic discharge protection circuit, the third power side voltage clamp element included in the third power side electrostatic discharge protection circuit, the first ground side voltage clamp element included in the first ground side electrostatic discharge protection circuit, the second ground side voltage clamp element included in the second ground side electrostatic discharge protection circuit, and the third ground side voltage clamp element included in the third ground side electrostatic discharge protection circuit are PN junction diodes.

19. The semiconductor integrated circuit according to claim 15, wherein the first power side voltage clamp element included in the first power side electrostatic discharge protection circuit, the second power side voltage clamp element included in the second power side electrostatic discharge protection circuit, the third power side voltage clamp element included in the third power side electrostatic discharge protection circuit, the first ground side voltage clamp element included in the first ground side electrostatic discharge protection circuit, the second ground side voltage clamp element included in the second ground side electrostatic discharge protection circuit, and the third ground side voltage clamp element included in the third ground side electrostatic discharge protection circuit are transistors.

20. The semiconductor integrated circuit according to claim 15, wherein the power side coupling midpoint is configured with ring coupling of a plurality of power side current limiting elements, and the ground side coupling midpoint is configured with ring coupling of a plurality of ground side current limiting elements.

* * * * *